（12) United States Patent
Bell et al.

(10) Patent No.: US 8,595,218 B2
(45) Date of Patent: Nov. 26, 2013

(54) INTERACTIVE DISPLAY MANAGEMENT SYSTEMS AND METHODS

(75) Inventors: Matthew Bell, Palo Alto, CA (US); Scott Anthony Bylo Chacon, Dublin, CA (US); Nick Hengeveld, San Carlos, CA (US)

(73) Assignee: Intellectual Ventures Holding 67 LLC, Redwood City, CA (US)

( * ) Notice: Subject to any disclaimer, the term of this patent is extended or adjusted under 35 U.S.C. 154(b) by 481 days.

(21) Appl. No.: 12/484,066

(22) Filed: Jun. 12, 2009
(Under 37 CFR 1.47)

(65) Prior Publication Data
US 2010/0121866 A1 May 13, 2010

Related U.S. Application Data

(60) Provisional application No. 61/061,105, filed on Jun. 12, 2008.

(51) Int. Cl.
*G06F 7/00* (2006.01)
*G06F 17/30* (2006.01)

(52) U.S. Cl.
USPC ........... 707/722; 707/736; 707/758; 715/700; 715/701

(58) Field of Classification Search
USPC ........... 707/705, 722, 736, 758, 999.1, 999.3; 715/700, 701
See application file for complete search history.

(56) References Cited

U.S. PATENT DOCUMENTS

| | | | |
|---|---|---|---|
| 2,917,980 A | 12/1959 | Grube et al. | |
| 3,068,754 A | 12/1962 | Benjamin et al. | |
| 3,763,468 A | 10/1973 | Ovshinsky et al. | |
| 4,053,208 A | 10/1977 | Kato et al. | |
| 4,275,395 A | 6/1981 | Dewey et al. | |
| 4,573,191 A | 2/1986 | Kidode et al. | |
| 4,725,863 A | 2/1988 | Dumbreck et al. | |
| 4,769,697 A | 9/1988 | Gilley et al. | |
| 4,791,572 A | 12/1988 | Green et al. | |

(Continued)

FOREIGN PATENT DOCUMENTS

| | | |
|---|---|---|
| EP | 0 055 366 A2 | 7/1982 |
| EP | 0 626 636 A2 | 11/1994 |

(Continued)

OTHER PUBLICATIONS

Notice of Opposition in European Application No. 02739710.8 dated Aug. 23, 2010.

(Continued)

*Primary Examiner* — Hares Jami
(74) *Attorney, Agent, or Firm* — Knobbe Martens Olson & Bear LLP

(57) ABSTRACT

An interactive display management device for managing content to be displayed on each of a plurality of interactive display devices is configured to receive respective content items from each of one or more content clients. Interactive display devices transmit interaction data indicating interactions between one or more body parts of users or objects held by users and virtual objects displayed on respective interactive display devices to the display management device, and the display management device is configured to determine, based at least on the interaction data received from one or more interactive display devices, playlists for respective interactive display devices, wherein the playlists indicate one or more content item to be displayed on the respective display device.

17 Claims, 8 Drawing Sheets

(56) References Cited

U.S. PATENT DOCUMENTS

| | | |
|---|---|---|
| 4,843,568 A | 6/1989 | Krueger et al. |
| 4,887,898 A | 12/1989 | Halliburton et al. |
| 4,948,371 A | 8/1990 | Hall |
| 5,001,558 A | 3/1991 | Burley et al. |
| 5,138,304 A | 8/1992 | Bronson |
| 5,151,718 A | 9/1992 | Nelson |
| 5,239,373 A | 8/1993 | Tang et al. |
| 5,276,609 A | 1/1994 | Durlach |
| 5,319,496 A | 6/1994 | Jewell et al. |
| 5,325,472 A | 6/1994 | Horiuchi et al. |
| 5,325,473 A | 6/1994 | Monroe et al. |
| 5,418,583 A | 5/1995 | Masumoto |
| 5,426,474 A | 6/1995 | Rubstov et al. |
| 5,436,639 A | 7/1995 | Arai et al. |
| 5,442,252 A | 8/1995 | Golz |
| 5,454,043 A | 9/1995 | Freeman |
| 5,473,396 A | 12/1995 | Okajima et al. |
| 5,497,269 A | 3/1996 | Gal |
| 5,510,828 A | 4/1996 | Lutterbach et al. |
| 5,526,182 A | 6/1996 | Jewell et al. |
| 5,528,263 A | 6/1996 | Platzker et al. |
| 5,528,297 A | 6/1996 | Seegert et al. |
| 5,534,917 A | 7/1996 | MacDougall |
| 5,548,694 A | 8/1996 | Gibson |
| 5,591,972 A | 1/1997 | Noble et al. |
| 5,594,469 A | 1/1997 | Freeman et al. |
| 5,633,691 A | 5/1997 | Vogeley et al. |
| 5,662,401 A | 9/1997 | Shimizu et al. |
| 5,703,637 A | 12/1997 | Miyazaki et al. |
| 5,771,307 A | 6/1998 | Lu et al. |
| 5,808,784 A | 9/1998 | Ando et al. |
| 5,846,086 A | 12/1998 | Bizzi et al. |
| 5,861,881 A | 1/1999 | Freeman et al. |
| 5,882,204 A | 3/1999 | Iannazo et al. |
| 5,900,982 A | 5/1999 | Dolgoff et al. |
| 5,923,380 A | 7/1999 | Yang et al. |
| 5,923,475 A | 7/1999 | Kurtz et al. |
| 5,953,152 A | 9/1999 | Hewlett |
| 5,966,696 A | 10/1999 | Giraud |
| 5,969,754 A | 10/1999 | Zeman |
| 5,978,136 A | 11/1999 | Ogawa et al. |
| 5,982,352 A | 11/1999 | Pryor |
| 6,008,800 A | 12/1999 | Pryor |
| 6,058,397 A | 5/2000 | Barrus et al. |
| 6,075,895 A | 6/2000 | Qiao et al. |
| 6,084,979 A | 7/2000 | Kanada et al. |
| 6,088,612 A | 7/2000 | Blair |
| 6,097,369 A | 8/2000 | Wambach |
| 6,106,119 A | 8/2000 | Edwards |
| 6,118,888 A | 9/2000 | Chino et al. |
| 6,125,198 A | 9/2000 | Onda |
| 6,166,744 A | 12/2000 | Jaszlics et al. |
| 6,176,782 B1 | 1/2001 | Lyons et al. |
| 6,191,773 B1 | 2/2001 | Maruno et al. |
| 6,198,487 B1 | 3/2001 | Fortenbery et al. |
| 6,198,844 B1 | 3/2001 | Nomura |
| 6,217,449 B1 | 4/2001 | Kaku |
| 6,254,246 B1 | 7/2001 | Tiao et al. |
| 6,263,339 B1 | 7/2001 | Hirsh |
| 6,270,403 B1 | 8/2001 | Watanabe et al. |
| 6,278,418 B1 | 8/2001 | Doi |
| 6,292,171 B1 | 9/2001 | Fu et al. |
| 6,304,267 B1 | 10/2001 | Sata |
| 6,308,565 B1 | 10/2001 | French et al. |
| 6,323,895 B1 | 11/2001 | Sata |
| 6,333,735 B1 | 12/2001 | Anvekar |
| 6,335,977 B1 | 1/2002 | Kage |
| 6,339,748 B1 | 1/2002 | Hiramatsu |
| 6,349,301 B1 | 2/2002 | Mitchell et al. |
| 6,351,222 B1 | 2/2002 | Swan et al. |
| 6,353,428 B1 | 3/2002 | Maggioni et al. |
| 6,359,612 B1 | 3/2002 | Peter et al. |
| 6,388,657 B1 | 5/2002 | Natoli |
| 6,394,896 B2 | 5/2002 | Sugimoto |
| 6,400,374 B2 | 6/2002 | Lanier |
| 6,407,870 B1 | 6/2002 | Hurevich et al. |
| 6,414,672 B2 | 7/2002 | Rekimoto et al. |
| 6,445,815 B1 | 9/2002 | Sato |
| 6,454,419 B2 | 9/2002 | Kitazawa |
| 6,464,375 B1 | 10/2002 | Wada et al. |
| 6,480,267 B2 | 11/2002 | Yanagi et al. |
| 6,491,396 B2 | 12/2002 | Karasawa et al. |
| 6,501,515 B1 | 12/2002 | Iwamura |
| 6,513,953 B1 | 2/2003 | Itoh |
| 6,522,312 B2 | 2/2003 | Ohshima et al. |
| 6,545,706 B1 | 4/2003 | Edwards et al. |
| 6,552,760 B1 | 4/2003 | Gotoh et al. |
| 6,598,978 B2 | 7/2003 | Hasegawa |
| 6,607,275 B1 | 8/2003 | Cimini et al. |
| 6,611,241 B1 | 8/2003 | Firester et al. |
| 6,654,734 B1 | 11/2003 | Mani et al. |
| 6,658,150 B2 | 12/2003 | Tsuji et al. |
| 6,661,918 B1 | 12/2003 | Gordon et al. |
| 6,677,969 B1 | 1/2004 | Hongo |
| 6,707,054 B2 | 3/2004 | Ray |
| 6,707,444 B1 | 3/2004 | Hendriks et al. |
| 6,712,476 B1 | 3/2004 | Ito et al. |
| 6,720,949 B1 | 4/2004 | Pryor et al. |
| 6,732,929 B2 | 5/2004 | Good et al. |
| 6,747,666 B2 | 6/2004 | Utterback |
| 6,752,720 B1 | 6/2004 | Clapper et al. |
| 6,754,370 B1 | 6/2004 | Hall-Holt et al. |
| 6,791,700 B2 | 9/2004 | Omura et al. |
| 6,808,293 B2 | 10/2004 | Watanabe et al. |
| 6,826,727 B1 | 11/2004 | Mohr et al. |
| 6,831,664 B2 | 12/2004 | Marmaropoulos et al. |
| 6,871,982 B2 | 3/2005 | Holman et al. |
| 6,873,710 B1 | 3/2005 | Cohen-Solal et al. |
| 6,877,882 B1 | 4/2005 | Haven et al. |
| 6,882,480 B2 | 4/2005 | Yanagisawa |
| 6,902,310 B2 | 6/2005 | Im |
| 6,912,313 B2 | 6/2005 | Li |
| 6,965,693 B1 | 11/2005 | Kondo et al. |
| 6,975,360 B2 | 12/2005 | Slatter |
| 6,999,600 B2 | 2/2006 | Venetianer |
| 7,000,200 B1 | 2/2006 | Martins |
| 7,015,894 B2 | 3/2006 | Morohoshi |
| 7,042,440 B2 | 5/2006 | Pryor et al. |
| 7,054,068 B2 | 5/2006 | Yoshida et al. |
| 7,058,204 B2 | 6/2006 | Hildreth et al. |
| 7,068,274 B2 | 6/2006 | Welch et al. |
| 7,069,516 B2 | 6/2006 | Rekimoto |
| 7,084,859 B1 | 8/2006 | Pryor et al. |
| 7,088,508 B2 | 8/2006 | Ebina et al. |
| 7,129,927 B2 | 10/2006 | Mattsson |
| 7,149,262 B1 | 12/2006 | Nayar et al. |
| 7,158,676 B1 | 1/2007 | Rainsford |
| 7,170,492 B2 | 1/2007 | Bell |
| 7,190,832 B2 | 3/2007 | Frost et al. |
| 7,193,608 B2 | 3/2007 | Stuerzlinger |
| 7,227,526 B2 | 6/2007 | Hildreth et al. |
| 7,259,747 B2 | 8/2007 | Bell |
| 7,262,874 B2 | 8/2007 | Suzuki |
| 7,268,950 B2 | 9/2007 | Poulsen |
| 7,289,130 B1 | 10/2007 | Satoh et al. |
| 7,330,584 B2 | 2/2008 | Weiguo et al. |
| 7,331,856 B1 | 2/2008 | Nakamura et al. |
| 7,339,521 B2 | 3/2008 | Scheidemann et al. |
| 7,348,963 B2 | 3/2008 | Bell |
| 7,379,563 B2 | 5/2008 | Shamaie |
| 7,382,897 B2 | 6/2008 | Brown et al. |
| 7,394,459 B2 | 7/2008 | Bathiche et al. |
| 7,428,542 B1 | 9/2008 | Fink et al. |
| 7,431,253 B2 | 10/2008 | Yeh |
| 7,432,917 B2 | 10/2008 | Wilson et al. |
| 7,468,742 B2 | 12/2008 | Ahn et al. |
| 7,536,032 B2 | 5/2009 | Bell |
| 7,559,841 B2 | 7/2009 | Hashimoto |
| 7,576,727 B2 | 8/2009 | Bell |
| 7,598,942 B2 | 10/2009 | Underkoffler et al. |
| 7,619,824 B2 | 11/2009 | Poulsen |
| 7,665,041 B2 | 2/2010 | Wilson et al. |
| 7,671,321 B2 | 3/2010 | Perlman et al. |
| 7,710,391 B2 | 5/2010 | Bell et al. |

(56) References Cited

U.S. PATENT DOCUMENTS

| | | |
|---|---|---|
| 7,728,280 B2 | 6/2010 | Feilkas et al. |
| 7,737,636 B2 | 6/2010 | Li et al. |
| 7,738,725 B2 | 6/2010 | Raskar et al. |
| 7,745,771 B2 | 6/2010 | Troxell et al. |
| RE41,685 E | 9/2010 | Feldman et al. |
| 7,809,167 B2 | 10/2010 | Bell |
| 7,834,846 B1 | 11/2010 | Bell |
| 7,961,906 B2 | 6/2011 | Ruedin |
| 7,971,156 B2 | 6/2011 | Albertson et al. |
| 8,018,579 B1 | 9/2011 | Krah |
| 8,035,612 B2 | 10/2011 | Bell et al. |
| 8,035,624 B2 | 10/2011 | Bell et al. |
| 8,081,822 B1 | 12/2011 | Bell |
| 8,085,293 B2 | 12/2011 | Brodsky et al. |
| 8,085,994 B2 | 12/2011 | Kim |
| 8,098,277 B1 | 1/2012 | Bell |
| 8,159,682 B2 | 4/2012 | Bell |
| 8,199,108 B2 | 6/2012 | Bell et al. |
| 8,230,367 B2 | 7/2012 | Bell et al. |
| 8,259,163 B2 | 9/2012 | Bell et al. |
| 2001/0012001 A1 | 8/2001 | Rekimoto et al. |
| 2001/0033675 A1 | 10/2001 | Maurer et al. |
| 2002/0006583 A1 | 1/2002 | Michiels et al. |
| 2002/0032697 A1 | 3/2002 | French et al. |
| 2002/0032906 A1* | 3/2002 | Grossman ............... 725/42 |
| 2002/0041327 A1 | 4/2002 | Hildreth et al. |
| 2002/0046100 A1 | 4/2002 | Kinjo |
| 2002/0064382 A1 | 5/2002 | Hildreth et al. |
| 2002/0073417 A1 | 6/2002 | Kondo et al. |
| 2002/0078441 A1 | 6/2002 | Drake et al. |
| 2002/0081032 A1 | 6/2002 | Chen et al. |
| 2002/0103617 A1 | 8/2002 | Uchiyama et al. |
| 2002/0105623 A1 | 8/2002 | Pinhanez |
| 2002/0130839 A1 | 9/2002 | Wallace et al. |
| 2002/0140633 A1 | 10/2002 | Rafii et al. |
| 2002/0140682 A1 | 10/2002 | Brown et al. |
| 2002/0158984 A1 | 10/2002 | Brodsky et al. |
| 2002/0178440 A1 | 11/2002 | Agnihorti et al. |
| 2002/0186221 A1 | 12/2002 | Bell |
| 2003/0032484 A1 | 2/2003 | Ohshima et al. |
| 2003/0065563 A1 | 4/2003 | Elliott et al. |
| 2003/0076293 A1 | 4/2003 | Mattsson |
| 2003/0078840 A1* | 4/2003 | Strunk et al. ............ 705/14 |
| 2003/0091724 A1 | 5/2003 | Mizoguchi |
| 2003/0093784 A1 | 5/2003 | Dimitrova et al. |
| 2003/0098819 A1 | 5/2003 | Sukthankar et al. |
| 2003/0103030 A1 | 6/2003 | Wu |
| 2003/0113018 A1 | 6/2003 | Nefian et al. |
| 2003/0122839 A1 | 7/2003 | Matraszek et al. |
| 2003/0126013 A1 | 7/2003 | Shand |
| 2003/0137494 A1 | 7/2003 | Tulbert |
| 2003/0161502 A1 | 8/2003 | Morihara et al. |
| 2003/0178549 A1 | 9/2003 | Ray |
| 2004/0005924 A1 | 1/2004 | Watabe et al. |
| 2004/0015783 A1 | 1/2004 | Lennon et al. |
| 2004/0046736 A1 | 3/2004 | Pryor et al. |
| 2004/0046744 A1 | 3/2004 | Rafii et al. |
| 2004/0073541 A1 | 4/2004 | Lindblad et al. |
| 2004/0091110 A1 | 5/2004 | Barkans |
| 2004/0095768 A1 | 5/2004 | Watanabe et al. |
| 2004/0165006 A1* | 8/2004 | Kirby et al. ............ 345/740 |
| 2004/0183775 A1 | 9/2004 | Bell |
| 2005/0028188 A1* | 2/2005 | Latona et al. .......... 725/13 |
| 2005/0039206 A1* | 2/2005 | Opdycke ............... 725/35 |
| 2005/0086695 A1* | 4/2005 | Keele et al. ............ 725/86 |
| 2005/0088407 A1 | 4/2005 | Bell |
| 2005/0089194 A1 | 4/2005 | Bell |
| 2005/0104506 A1 | 5/2005 | Youh et al. |
| 2005/0110964 A1 | 5/2005 | Bell |
| 2005/0122308 A1 | 6/2005 | Bell et al. |
| 2005/0132266 A1 | 6/2005 | Ambrosino et al. |
| 2005/0147135 A1 | 7/2005 | Kurtz et al. |
| 2005/0147282 A1 | 7/2005 | Fujii |
| 2005/0151850 A1 | 7/2005 | Ahn et al. |
| 2005/0162381 A1 | 7/2005 | Bell et al. |
| 2005/0185828 A1 | 8/2005 | Semba et al. |
| 2005/0195598 A1 | 9/2005 | Dancs et al. |
| 2005/0265587 A1 | 12/2005 | Schneider |
| 2006/0001760 A1 | 1/2006 | Matsumura et al. |
| 2006/0010400 A1 | 1/2006 | Dehlin et al. |
| 2006/0031786 A1 | 2/2006 | Hillis et al. |
| 2006/0078015 A1 | 4/2006 | Franck |
| 2006/0132432 A1 | 6/2006 | Bell |
| 2006/0132725 A1 | 6/2006 | Terada et al. |
| 2006/0139314 A1* | 6/2006 | Bell ........................ 345/156 |
| 2006/0168515 A1 | 7/2006 | Dorsett, Jr. et al. |
| 2006/0184993 A1 | 8/2006 | Goldthwaite et al. |
| 2006/0187545 A1 | 8/2006 | Doi |
| 2006/0227099 A1 | 10/2006 | Han et al. |
| 2006/0242145 A1 | 10/2006 | Krishnamurthy et al. |
| 2006/0256382 A1 | 11/2006 | Matraszek et al. |
| 2006/0258397 A1 | 11/2006 | Kaplan et al. |
| 2006/0294247 A1 | 12/2006 | Hinckley et al. |
| 2006/0294258 A1* | 12/2006 | Powers-Boyle et al. ...... 709/246 |
| 2007/0002039 A1 | 1/2007 | Pendleton et al. |
| 2007/0019066 A1 | 1/2007 | Cutler |
| 2007/0199035 A1* | 8/2007 | Schwartz et al. ............. 725/110 |
| 2007/0285419 A1 | 12/2007 | Givon |
| 2008/0013826 A1 | 1/2008 | Hillis et al. |
| 2008/0018595 A1 | 1/2008 | Hildreth et al. |
| 2008/0030460 A1 | 2/2008 | Hildreth et al. |
| 2008/0036732 A1* | 2/2008 | Wilson et al. ................ 345/156 |
| 2008/0040692 A1 | 2/2008 | Sunday et al. |
| 2008/0062123 A1 | 3/2008 | Bell |
| 2008/0062257 A1 | 3/2008 | Corson |
| 2008/0090484 A1 | 4/2008 | Lee et al. |
| 2008/0135733 A1 | 6/2008 | Feilkas et al. |
| 2008/0150890 A1 | 6/2008 | Bell et al. |
| 2008/0150913 A1 | 6/2008 | Bell et al. |
| 2008/0159591 A1 | 7/2008 | Ruedin |
| 2008/0170776 A1 | 7/2008 | Albertson et al. |
| 2008/0245952 A1 | 10/2008 | Troxell et al. |
| 2008/0252596 A1 | 10/2008 | Bell et al. |
| 2008/0292144 A1 | 11/2008 | Kim |
| 2009/0027337 A1 | 1/2009 | Hildreth |
| 2009/0077504 A1 | 3/2009 | Bell et al. |
| 2009/0079813 A1 | 3/2009 | Hildreth |
| 2009/0102788 A1 | 4/2009 | Nishida et al. |
| 2009/0106785 A1* | 4/2009 | Pharn ........................ 725/9 |
| 2009/0172606 A1 | 7/2009 | Dunn et al. |
| 2009/0179733 A1* | 7/2009 | Hattori et al. ................. 340/5.6 |
| 2009/0225196 A1 | 9/2009 | Bell et al. |
| 2009/0235295 A1 | 9/2009 | Bell et al. |
| 2009/0251685 A1 | 10/2009 | Bell et al. |
| 2010/0026624 A1 | 2/2010 | Bell et al. |
| 2010/0039500 A1 | 2/2010 | Bell et al. |
| 2010/0060722 A1 | 3/2010 | Bell et al. |
| 2011/0157316 A1 | 6/2011 | Okamoto et al. |
| 2012/0080411 A1 | 4/2012 | Mizuyama et al. |
| 2012/0200843 A1 | 8/2012 | Bell et al. |
| 2012/0287044 A1 | 11/2012 | Bell et al. |
| 2012/0293625 A1 | 11/2012 | Schneider et al. |
| 2012/0317511 A1 | 12/2012 | Bell et al. |

FOREIGN PATENT DOCUMENTS

| | | |
|---|---|---|
| EP | 0 913 790 A1 | 5/1999 |
| EP | 1 689 172 A1 | 6/2002 |
| JP | 57-094672 A | 6/1982 |
| JP | 10-207619 | 8/1998 |
| JP | 11-057216 | 3/1999 |
| JP | 2000-105583 | 4/2000 |
| JP | 2002-014997 | 1/2002 |
| JP | 2002-092023 | 3/2002 |
| JP | 2002-171507 | 6/2002 |
| JP | 2003-517642 | 5/2003 |
| JP | 2003-271084 | 9/2003 |
| JP | 2004-246578 | 9/2004 |
| JP | 2007-514242 | 5/2007 |
| KR | 2003-0058894 | 7/2003 |
| WO | WO 98/38533 A1 | 9/1998 |
| WO | WO 00/16562 A1 | 3/2000 |
| WO | WO 01/63916 A1 | 8/2001 |
| WO | WO 02/01537 A2 | 1/2002 |

(56) References Cited

FOREIGN PATENT DOCUMENTS

| | | |
|---|---|---|
| WO | WO 02/100094 A2 | 12/2002 |
| WO | WO 2004/055776 A1 | 7/2004 |
| WO | WO 2004/097741 A1 | 11/2004 |
| WO | WO 2005/003948 | 1/2005 |
| WO | WO 2005/041578 A2 | 5/2005 |
| WO | WO 2005/041579 A3 | 5/2005 |
| WO | WO 2005/057398 A2 | 6/2005 |
| WO | WO 2005/057399 A2 | 6/2005 |
| WO | WO 2005/057921 A2 | 6/2005 |
| WO | WO 2005/091651 A2 | 9/2005 |
| WO | WO 2007/019443 A1 | 2/2007 |
| WO | WO 2008/124820 A1 | 10/2008 |
| WO | WO 2009/035705 A1 | 3/2009 |

OTHER PUBLICATIONS

Official Report in Australian Application No. 2008299883, dated Dec. 8, 2010.

DePiero et al; "3-D Computer Vision Using Structured Light: Design, Calibrations and Implementation Issues"; Advances in Computers, vol. 43, pp. 243-278, 1996.

Huang, Mark et al. "Shadow Vision," Introduction to Computer Graphics, Fall 1999, Dec. 6, 1999; pp. 1-10, XP55013291 <http:groups.csail.mit.edu/graphics/classes/6.837/F99/projects/reports/team16.pdf>.

Leibe, Bastian, et al., "The Perspective Workbench; Toward Spontaneous and Natural Interaction in Semi-Immersive Virtual Environments," Mar. 18-22, 2000, IEEE Computer Society, Los Alamitos, CA; pp. 13-20.

Paradiso, Joseph et al., "Optical Tracking for Music and Dance Performance," Conference on Optical 3-D Measurement Techniques, XX, XX, No. 4th, Sep. 30, 1997, pp. 1-8, XP002548974. <http://www.media.mit.edu/resenv/pubs/papers/97_09_Zurich_3D4.pdf>.

Quinz, Emanuele; "Conference Papers", Apr. 10, 2001, XP55013293, Retrieved from the internet <http://www.isea2000.com/pop_actes.htm>.

Quinz, Emanuele; "Digital Performance", pp. 1-3, Retrieved from the internet on Nov. 28, 2011 <http://www.noemalab.org/sections/ideas/ideas_articles/pdf/.

Sparacino, Flavia, et al., "Dance Space: An Interactive Video Interface", Actes/Proceeding, ISEA2000—Oct. 12, 2000—Auditorium 1, Dec. 10, 2000.

Maria Langer, "Mac OS X 10.2: Visual QuickStart Guide," Sep. 17, 2002, Peachpit Press, p. 111.

Rekimoto, Jun, "SmartSkin: Am Infrastructure for Freehand Manipulation on Interactive Surfaces." Vol. No. 4, Issue No. 1, pp. 113-120, Apr. 2002.

Xiao, Yang; "Throughput and Delay Limits of IEEE 802.11," IEEE Communications Letters, vol. 6, No. 8, pp. 355-357, Aug. 2002.

International Preliminary Report on Patentability for PCT/US2008/10750, filed Sep. 15, 2008.

Letter of the opponent O2 dated May 28, 2010 in European Application No. 02739710.8, filed Jun. 4, 2002.

EffecTV Version 0.2.0 released Mar. 27, 2001, available online at <http://web.archive.org/web/20010101-20010625re_http://effectv.sourceforge.net>.

Index of EffecTV, as downloaded on Apr. 30, 2007 at <http://effectv.cvs.sourceforge.net/effectv/EffecTV/?pathrev=rel_0_2_0>.

R111, The Transformation From Digital Information to Analog Matter, available online at <http://www.particles.de/paradocs/r111/10mkp2004/hmtl/r111_text111hock04.html>.

2001 Symposium on Interactive 3D Graphics program description, ACM SIGGRAPH, held Mar. 19-21, 2001, Research Triangle Park, NC, downloaded from <http://www.allconferences.com/conferences/2000830092631/>; cited during opposition of European Application No.

Affidavit of Daniel Barthels regarding EffecTV, dated May 15, 2007 (partial machine translation), cited during opposition of European Application No. 02739710.8, filed Jun. 4, 2002.

Announcement: Workshop on Perceptual User Interfaces, The Banff Rocky Mountain Resort, Banff, Alberta, Canada, Oct. 20-21, 1997, can be found at <http://www.research.microsoft.com/PUIWorkshop/>, cited during opposition of European Application No. 02739.

Bodymover Body Movement as a Means to Obtain an Audiovisual Spatial Experience, 2000 ART+COM AG Berlin; <http://www.artcom.de/index.php?option=com_acprojects&page=6&id=28&Itemid=144&details=0&lang=en>.

ART+COM Bodymover 2000, as downloaded on Aug. 21, 2009 from <http://www.artcom.de/index.php?option=com_acprojects &page=6&id=28&Itemid=144&details=0&lang=en>, cited during opposition of European Application No. 02739710.8, filed Jun. 4, 2002.

Article 96(2) Communication dated Feb. 25, 2005 in European Application No. 02739710.8.

Article 96(2) Communication dated Mar. 31, 2004 in European Application No. 02739710.8.

Brown, Matthew, et al. "Multi-Image Matching using Multi-Scale Oriented Patches," Technical Report, Dec. 2004, pp. 1-48, available online at <ftp://ftp.research.microsoft.com/pub/tr/TR-2004-133.pdf>.

Brown, Matthew, et al., "Multi-Image Matching using Multi-Scale Oriented Patches," Proceedings of the 2005 IEEE Computer Society Conference on Computer Vision and Pattern Recognition, Conference Publication Date: Jun. 20-25, 2005, 8 pgs.

Buxton, Bill, "Multi-Touch Systems That I Have Known and Loved," accessed Mar. 21, 2007, http://billbuxton.com/multitouchOverview.html.

Communication dated Dec. 10, 2008 from Patentanwalt attaching article by Katy Bachman, entitled "Reactrix Up for Sale," cited during opposition of European Application No. 02739710.8, filed Jun. 4, 2002.

Crouser, P.D., et al., "Unattenuated tracer particle extraction through time-averaged, background image subtraction with outlier rejection," Experiments in Fluids, 22, 1997, 220-228, Springer-Verlag.

Davis, J.W., et al., "SIDEshow: A Silhouette-based Interactive Dual-screen Environment," Aug. 1998, MIT Media Lab Tech Report No. 457.

Demarest, Ken, "Sand," 2000, Mine Control, art installation, available online at <http://www.mine-control.com>.

EffecTV Software Source: effect module, dated May 20, 2001 (German); cited during opposition of European Application No. 02739710.8, filed Jun. 4, 2002.

Eigammai, Ahmed, et al., "Non-parametric Model for Background Subtraction," Jun. 2000, European Conference on Computer Vision, Lecture Notes on Computer Science, vol. 1843, pp. 751-767.

Extended Search Report for European Application No. 06010825.5, filed Jun. 4, 2002, dated Jul. 10, 2006.

Dachselt, Raimund, et al., "CONTIGRA: An XML-Based Architecture for Component-Oriented 3D Applications, 3D Technologies for the World Wide Web, Proceedings of the Seventh International Conference on 3D Technology," ACM, Feb. 24-28, 2002, pp. 155-163.

Foerterer, Holger, "Fluidum," 1999, art installation, description available online at <http://www.foerterer.com/fluidum>.

Foerterer, Holger, "Helikopter," 2001, art installation, description available online at <http://www.foerterer.com/helikopter>.

Freeman, William, et al., "Computer vision for interactive computer graphics," May-Jun. 1998, IEEE Computer Graphics and Applications, vol. 18, No. 3, pp. 42-53.

Frisken, Sarah F. et al., "Adaptively Sampled Distance Fields: A General Representation of Shape for Computer Graphics," Jul. 23-28, 2000, Proceedings of the 27th Annual Conference on Computer Graphics and Interactive Techniques, pp. 249-254.

Fujihata, Masaki, "Beyond Pages," 1995, art installation, description available online at <http://on1.zkm.de/zkm/werke/BeyondPages>.

Goetz, Frank, et al., "An XML-based Visual Shading Language for Vertex and Fragment Shaders," 3D Technologies for the World Wide Web, Proceedings of Ninth International Conference on 3D Technology; ACM, Apr. 5-8, 2004; pp. 87-97.

GroundFX Document, GestureTek (Very Vivid, Inc.), description available online at <http://www.gesturetek.com/groundfx>, downloaded on Aug. 11, 2006.

(56) References Cited

OTHER PUBLICATIONS

Haller, Michael et al., "Coeno-Storyboard: An Augmented Surface for Storyboard Presentations," Mensch & Computer 2005, Sep. 4-7, 2005, Linz, Austria.

Han, Jefferson Y., "Low-Cost Multi-Touch Sensing Through Frustrated Total Internal Reflection," Oct. 23-26, 2005, ACM Symposium on User Interface Software and Technology (UIST).

Harville, Michael et al., "Foreground Segmentation Using Adaptive Mixture Models in Color and Depth," Jul. 8, 2001, Proceedings of IEEE Workshop on Detection and Recognition of Events in Video, pp. 3-11.

Hemmer, Raphael Lozano, "Body Movies," 2002, art project/installation, description available online at <http://www.lozano-hemmer.com/eproyecto.html>.

Hoff, Kenneth E. III et al, "Fast and Simple 2D Geometric Proximity Queries Using Graphics Hardware," Mar. 19-21, 2001, Proc. Of the 2001 Symposium on Interactive 3D Graphics, pp. 145-148.

International Preliminary Examination Report for PCT/US2002/017843, filed Jun. 4, 2002.

International Preliminary Report on Patentability for PCT/US2004/035477, filed Oct. 25, 2004.

International Preliminary Report on Patentability for PCT/US2004/035478, filed Oct. 25, 2004.

International Preliminary Report on Patentability for PCT/US2004/041318, filed Dec. 9, 2004.

International Preliminary Report on Patentability for PCT/US2004/041319, filed Dec. 9, 2004.

International Preliminary Report on Patentability for PCT/US2004/041320, filed Dec. 9, 2004.

International Preliminary Report on Patentability for PCT/US2005/008984, filed Mar. 18, 2005.

International Preliminary Report on Patentability for PCT/US2006/030720, filed on Aug. 4, 2006.

International Preliminary Report on Patentability for PCT/US2008/059900, filed on Apr. 10, 2008.

International Search Report for PCT/US03/40321, filed Dec. 15, 2003.

International Search Report for PCT/US2002/017843, filed Jun. 4, 2002, dated Feb. 5, 2003.

International Search Report for PCT/US2004/035477, filed Oct. 25, 2004.

Invitation to Pay Additional Fees and Partial ternational Search Report on Patentability for PCT/US2004/035478, filed Oct. 25, 2004.

International Search Report for PCT/US2004/035478, filed Oct. 25, 2004.

International Search Report for PCT/US2004/041318, filed Dec. 9, 2004.

International Search Report for PCT/US2004/041319, filed Dec. 9, 2004.

International Search Report for PCT/US2004/041320, filed Dec. 9, 2004.

International Search Report for PCT/US2005/008984, filed Mar. 18, 2005.

International Search Report for PCT/US2006/030720, filed Aug. 4, 2006.

International Search Report for PCT/US2008/059900, filed Apr. 10, 2008.

International Search Report for PCT/US2008/10750, filed Sep. 15, 2008.

Ivars Peterson, "Artificial reality; combining a person's live video image with computer graphics suggests novel ways of working and playing with computers" Science News, Jun. 22, 1985.

Jabri, Sumer et al., "Detection and Location of People in Video Images Using Adaptive Fusion of Color and Edge Information;" presented at the Int. Conf. Pattern Recognition, Barcelona, Spain, 2000.

Joyce, Arthur W. III, et al., "Implementation and capabilities of a virtual interaction system," Sep. 10-11, 1998, Proceedings 2nd European Conference on Disability, Virtual Reality and Associated Technologies, Skovde, Sweden, pp. 237-245.

Katz, Itai et al., "A Multi-Touch Surface Using Multiple Cameras," Oct. 3, 2007, Advanced Concepts for Intelligent Vision Systems, vol. 4678/2007.

Keays, Bill, "metaField Maze," 1998, exhibited at Siggraph'99 Emerging Technologies and Ars Electronica Aug. 8-13, 1999, description available online at <http://www.billkeays.com/metaFieldInfosheet1A.pdf>.

Keays, Bill, "Using High-Bandwidth Input/Output in Interactive Art," Jun. 1999, Master's Thesis, Massachusetts Institute of Technology, School of Architecture and Planning.

Khan, Jeff; "Intelligent Room with a View"; Apr.-May 2004, RealTime Arts Magazine, Issue 60, available online at www.realtimearts.net/article/60/7432.

Kjeldesn, Rick et al., "Dynamically Reconfigurable Vision-Based User Interfaces," Apr. 2003, 3rd International Conference on Vision Systems (ICVVS '03), Graz, Austria, pp. 6-12.

Kjeldsen, R. et al., "Interacting with Steerable Projected Displays," May 20-21, 2002, Proceedings of the 5th International Conference on Automatic Face and Gesture Recognition, Washington, D.C.

Kreuger, Myron, "Videoplace—An Artificial Reality," Apr. 1985, Conference on Human Factors in Computing Systems, San Francisco, California, pp. 35-40.

Kreuger, Myron, "Videoplace," 1969 and subsequent, summary available online at <http://www.jtnimoy.com/itp/newmediahistory/videoplace>.

Kurapati, Kaushal, et al., "A Multi-Agent TV Recommender," Jul. 13-14, 2001, Workshop on Personalization in Future TV, pp. 1-8, XP02228335.

Lamarre, Mathieu, et al., "Background subtraction using competing models in the block-DCT domain," Pattern Recognition, 2002 Proceedings, 16 International Conference in Quebec City, Que., Canada, Aug. 11-15, 2002, Los Alamitos, CA, USA, IEEE COMPUT SOC US.

Lantagne, Michel, et al., "VIP: Vision tool for comparing Images of People," Vision Interface, Jun. 11-13, 2003, pp. 1-8.

Leibe, Bastian, et al., "Towards Spontaneous Interaction with the Perceptive Workbench, a Semi-Immersive Virtual Environment," Nov./Dec. 2000, IEEE Computer Graphics and Applications, vol. 20, No. 6, pp. 54-65.

Lengyel, Jed et al., "Real-Time Robot Motion Planning Using Rasterizing Computer Graphics Hardware," Aug. 1990, ACM SIGGRAPH Computer Graphics, vol. 24, Issue 4, pp. 327-335.

Levin, Golan "Computer Vision for Artists and Designers: Pedagogic Tools and Techniques for Novice Programmers," Aug. 2006, AI & Society, vol. 20, Issue 4, pp. 462-482.

Letter dated May 16, 2007 from Christian Zuckschwerdt regarding EffecTV, (partial machine translation), cited during opposition of European Application No. 02739710.8, filed Jun. 4, 2002.

Lin, Mingxiu et al., "A New Approach for Vision-based Rear Vehicle Tracking," Key Laboratory of Integrated Automation of Process Industry, Ministry of Education, Northeastern University, Shenyang, Liaoning Province, China, held May 23-25, 2007, pp. 107-111.

Livingston, Mark Alan, "Vision-based Tracking with Dynamic Structured Light for Video See-through Augmented Reality," 1998, Ph.D. Dissertation, University of North Carolina at Chapel Hill.

Malik, Shahzad et al., "Visual Touchpad: A Two-Handed Gestural Input Device," Oct. 13-15, 2004, International Conference on Multimodal Interfaces (ICMI '04).

MacIver, Malcolm, et al., "Body Electric," Apr. 2003, art installation, description available online at <http://www.neuromech.northwestern.edu/uropatagium/#ArtSci>.

Mandala Systems, "Video Gesture Control System Concept," 1986, description available online at <http://www.vividgroup.com/tech.html>.

Microsoft Surface multi-touch interface table unveiled, May 30, 2007, downloaded from http://www.dancewithshadows.com/tech/microsoft-surface.asp.

Microsoft Surface Web Page, downloaded from http://www.microsoft.com/surface/Pages/Product/WhatIs.aspx on Sep. 24, 2009.

(56) References Cited

OTHER PUBLICATIONS

Experience Microsoft Surface, downloaded from http://www.microsoft.com/surface/Pages/Product/Specifications.aspx on Sep. 24, 2009.
Microsoft Surface, downloaded from http://en.wikipedia.org/wiki/Microsoft_surface on Sep. 24, 2009.
Mitsubishi DiamondTouch, http://www.merl.com/projects/DiamondTouch/, visited Mar. 21, 2007.
Mo, Zhenyao "SmartCanvas: A Gesture-Driven Intelligent Drawing Desk System," Jan. 9-12, 2005, Proceedings of Intelligent User Interfaces (IUI '05).
Morano, Raymond A. et al., "Structured Light Using Pseudorandom Codes," Mar. 1998, IEEE Transactions on Pattern Analysis and Machine Intelligence, vol. 20, No. 3.
Morris, T. et al., "Real-Time Fingertip Detection for Hand Gesture Recognition," Sep. 9-11, 2002, Advanced Concepts for Intelligent Vision Systems (ACIVS'04), Ghent University, Belgium.
Muench, Wolfgang, "Bubbles", Prix Ars Electonica Catalog 1999, Springer-Verlag, Berlin, Germany; available online at <http://hosting.zkm.de/wmuench/bub/text>.
Notice of Opposition in European Application No. 02739710.8 dated May 14, 2007.
Provision of the minutes in European Application No. 02739710.8 dated Dec. 28, 2009.
Decision revoking the European Patent in European Application No. 02739710.8 dated Dec. 28, 2009.
Observation by third party Michael Saup dated Jan. 17, 2005, cited during opposition of European Application No. 02739710.8, filed Jun. 4, 2002.
Observation by third party Petra Trefzger dated Jan. 17, 2005, cited during opposition of European Application No. 02739710.8, filed Jun. 4, 2002.
Observation by third party Simon Penny dated Jan. 17, 2005, cited during opposition of European Application No. 02739710.8, filed Jun. 4, 2002.
Paradiso, Joseph et al., "New Sensor and Music Systems for Large Interactive Surfaces," Aug. 2000, Proceedings of the Interactive Computer Music Conference, Berlin, Germany, pp. 277-280.
Penny, Simon, "Fugitive"; Oct. 1997; <http://www.ace.uci.edu/penny/works/fugitive/fugitive.html>.
Penny, Simon, et al., "Fugitive II," Jan. 8-Mar. 14, 2004, Australian Center for the Moving Image, art installation, description available online at <http://www.acmi.net.au/fugitive.jsp?>.
Penny, Simon, et al.; Traces: Wireless full body tracking in the CAVE, Dec. 16-18, 1999; Japan; ICAT Virtual Reality Conference; <http://turing.ace.uci.edu/pennytexts/traces/>.
Pinhanez, C. et al., "Ubiquitous Interactive Graphics," Jul. 29-31, 2003, IBM Research Report RC22495, available at <http://www.research.ibm.com/ed/publications/rc22495.pdf>.
Pinhanez, C., "The Everywhere Displays Projector: A Device to Create Ubiquitous Graphical Interfaces," Sep. 29-Oct. 2, 2001, Proceedings of the UbiComp 2001 Conference, Ubiquitous Computig Lecture Notes in Computer Science, Springer-Verlag, Berl.
Plasma; 3 pages; <http://www.particles.de/paradocs/plasma/index.html>, cited in U.S. Appl. No. 10/160,217, filed Aug. 8, 2005.
Reactrix, Inc. website, Mar. 28, 2003, <http://web.archive.org/web/20030328234205/http://www.reactrix.com> and <http://web.archive.org/web/20030328234205/http://www.reactrix.com/webdemo.php>.
Rekimoto, J., et al., "Perceptual Surfaces: Towards a Human and Object Sensitive Interactive Display," Oct. 19-21, 1997, Proceedings of the Workshop on Perceptual User Interfaces, Banff, Canada, pp. 30-32.
Ringel, M. et al., "Barehands: Implement-Free Interaction with a Wall-Mounted Display," Mar. 31-Apr. 5, 2001, Proceedings of the 2001 ACM CHI Conference on Human Factors in Computing Systems (Extended Abstracts), p. 367-368.
Rogala, Miroslaw, "Lovers Leap," Nov. 21-26, 1995, art installation, Dutch Electronic Arts Festival, description available online at <http://wayback.v2.nl/DEAF/persona/rogala.html>.
Rokeby, David, "Very Nervous System (VNS)," Mar. 1995, Wired Magazine, available online at <http://www.wired.com/wired/archive/3.03/rokeby.html>; sold as software at <http://homepage.mac.com/davidrokeby/softVNS.html>.
Rokeby, David, "softVNS 2 real time video processing and tracking software for Max;" SoftVNS 2 downloads, as downloaded from <http://homepage.mac.com/davidrokeby/softVNS.html> on Mar. 16, 2007.
Sato, Yoichi, et al., "Fast Tracking of Hands and Fingertips in Infrared Images for Augmented Desk Interface," Mar. 2000, 4th International Conference on Automatic Face -and Gesture-Recognition, Grenoble, France.
Schneider, John K., "Improved Fingerprint System Using Rolled and Multi-segmented Techniques," U.S. Appl. No. 60/575,952, filed Jun. 1, 2004, pp. 1-6.
Screenshots of Reactrix Product Demo Video, Mar. 28, 2003, <http://web.archive.org/web/20030407174258/http://www.reactrix.com/demo/reactrix_demo.wmv>.
Sester, Marie, "Access," Dec. 2001, Interaction 99 Biennial Catalog, Gifu, Japan, available online at <http://www.accessproject.net/concept.html>.
Snibbe, Scott, "Boundary Functions," Sep. 7-12, 1998, art installation, description available online at <http://snibbe.com/scott/bf/index.html>.
Snibbe, Scott, "Screen Series," 2002-2003 art installation, description available online at <http://snibbe.com/scott/screen/index.html>.
Sonneck, Georg, et al., "Optimized One-to-One Personalization of Web Applications using a Graph Based Model," IEEE-22, Apr. 26, 2003, 9 pgs.
Sparacino, Flavia, et al., "Media in performance: interactive spaces for dance, theater, circus and museum exhibits," Nov. 2000, IBM Systems Journal, vol. 39, No. 3-4, pp. 479-510.
Sparacino, Flavia, "(Some) computer visions based interfaces for interactive art and entertainment installations," 2001, INTER_FACE Body Boundaries, Anomalie digital_arts, No. 2, Paris, France.
Stauffer, Chris, et al., "Learning Patterns of Activity Using Real-Time Tracking," Aug. 2000, IEEE Transaction on Pattern Analysis and Machine Intelligence, vol. 22, No. 8, pp. 747-757.
Summons to Attend Oral Proceedings in European Application No. 02739710.8, dated Aug. 12, 2005.
Summons to Attend Oral Proceedings in European Application No. 02739710.8, dated Jun. 12, 2009.
Supreme Particles, "PLASMA/Architexture," 1994, available online at <http://www.particles.de/paradocs/plasma/index.html>.
Supreme Particles; R111, 1999, available online at <http://www.r111.org>, XP-002989704.
Tan, P, et al., "Highlight Removal by Illumination-Constrained Inpainting," Ninth IEEE International Conference on Computer Vision, Oct. 13-16, 2003.
The History of Microsoft Surface, downloaded from <http://www.microsoft.com/presspass/presskits/surfacecomputing/docs/SurfaceHistoryBG.doc> on Sep. 24, 2009.
Torr, P.H.S. et al., "The Development and Comparison of Robust Methods for Estimating the Fundamental Matrix," Sep./Oct. 1997, International Journal of Computer Vision, vol. 24, No. 3, pp. 271-300.
Toth, Daniel et al., "Illumination-Invariant Change Detection," Apr. 2-4, 2000, 4th IEEE Southwest Symposium on Image Analysis and Interpretation, p. 3.
Trefzger, Petra, "Vorwerk," 2000, art installation, description available online at <http://www.petracolor.de>.
Utterback, Camille, et al., "Text Rain," 1999, art installation, available online at <www.camilleutterback.com/textrain.html>.
Vogt, Florian et al., "Highlight Substitution in Light Fields," IEEE International Conference on Image Processing, Sep. 22-25, 2002.
Wang, Junxian, et al., "Specular reflection removal for human detection under aquatic environment," Jun. 27-Jul. 2, 2004 IEEE Conference on Computer and Pattern Recognition Workshop (CVPRW04) vol. 8, p. 130.
Wellner, Pierre, "Interacting with paper on the DigitalDesk," Jul. 1993, Communications of the ACM, Special issue on computer augmented environments: back to the real world, vol. 36, Issue 7, pp. 87-96.

(56) References Cited

OTHER PUBLICATIONS

Wellner, Pierre, "Digital Desk Calculator:Tangible Manipulation on a Desktop Display" Proceedings of the Symposium on User Interface Software and Technol (UIST), Hilton Head, S. Carolina, Nov. 11-13, 1991.

Wilson, Andrew, "PlayAnywhere: A Compact Interactive Tabletop Projection—Vision System," ACM Symposium on User Interface Software and Technology (UIST), Oct. 23-27, 2005, Seattle, Washington, U.S.A.

Written Opinion for PCT/US2002/017843, filed Jun. 4, 2002, dated Feb. 5, 2003.

Written Opinion of the International Searching Authority for PCT/US2004/035477, filed Oct. 25, 2004.

Written Opinion of the International Searching Authority for PCT/US2004/035478, filed Oct. 25, 2004.

Written Opinion of the International Searching Authority for PCT/US2004/041318, filed Dec. 9, 2004.

Written Opinion of the International Searching Authority for PCT/US2004/041319, filed Dec. 9, 2004.

Written Opinion of the International Searching Authority for PCT/US2004/041320, filed Dec. 9, 2004.

Written Opinion of the International Searching Authority for PCT/US2005/008984, filed Mar. 18, 2005.

Written Opinion of the International Searching Authority for PCT/US2006/030720, filed Aug. 4, 2006.

Written Opinion of the International Searching Authority for PCT/US2008/059900, filed Apr. 10, 2008.

* cited by examiner

INTERACTIVE DISPLAY MANAGEMENT SYSTEMS AND METHODS

CROSS-REFERENCE TO RELATED APPLICATIONS

This application claims priority under 35 U.S.C. §119(e) to U.S. Provisional Application Ser. No. 61/061,105, filed on Jun. 12, 2008, which is hereby expressly incorporated by reference in its entirety.

BACKGROUND

Networks of digital displays that render digital signage related to advertising, entertainment, educational, and/or other content items are installed across a wide range of physical spaces (e.g. a retailer network). Content items displayed on such digital displays can include images, videos, and interactive content that users can interact with in real time. The content may be associated with a plurality of different entities, such as advertisers, having different needs and/or goals for display of respective content items.

DETAILED DESCRIPTION

Figure 1A:
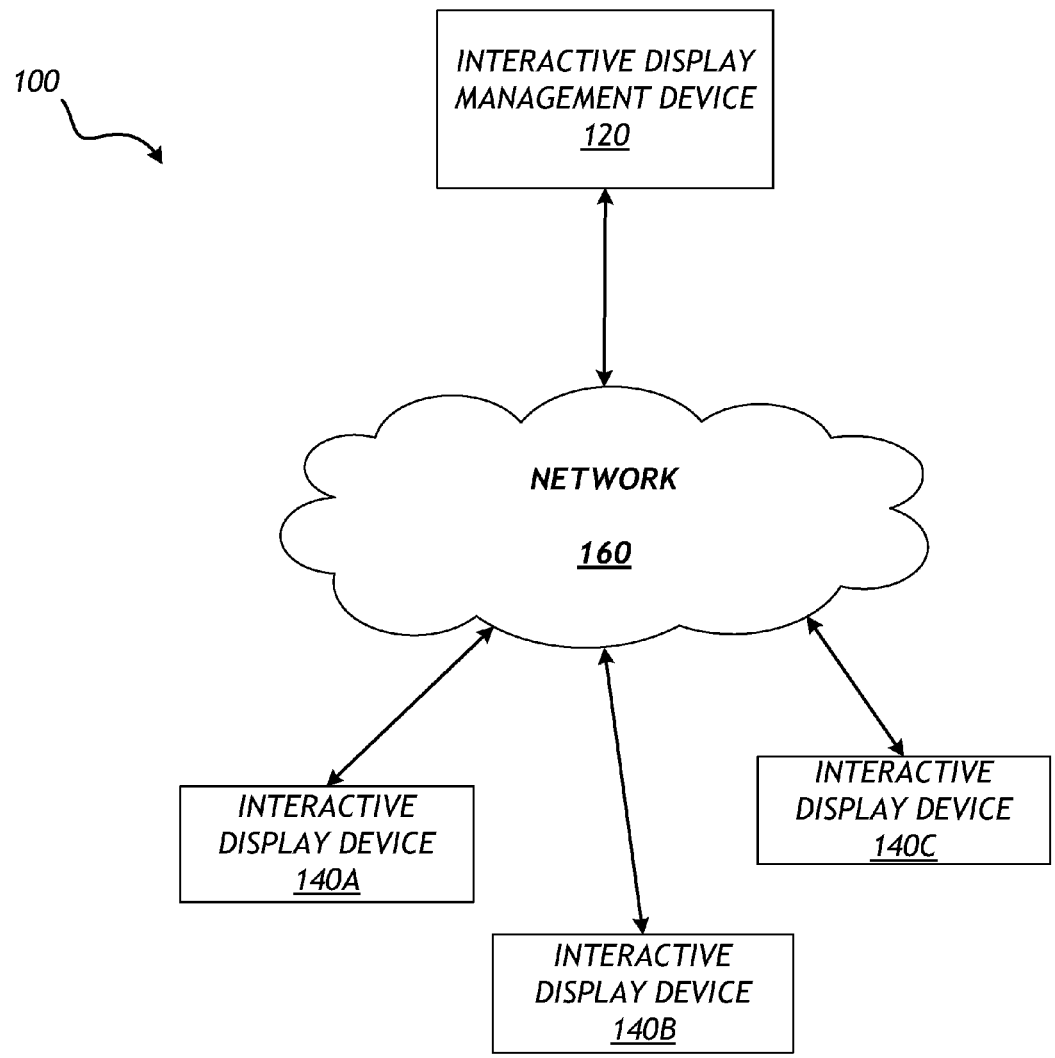
FIG. 1A is a block diagram illustrating one embodiment of a display management system including an interactive display management device in communication with a plurality of interactive display devices via a network.

Embodiments of the present disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments. Furthermore, embodiments described herein may include several novel features, no single one of which is solely responsible for its desirable attributes or which is essential to practicing the systems and methods herein described.

In one embodiment, an interactive display device management device (or simply "management device") manages a plurality of digital display devices that are in communication with the display management system via one or more networks. In one embodiment, the display devices comprise various types and/or sizes of display devices. For example, a first display device may include a touch sensitive display screen while a second display device includes a projector that projects video images onto a surface and one or more cameras that detect movements of users with respect to the surface. Additionally, the display devices may be positioned in different geographical locations, such as at different retail establishments in different locals, cities, states, or countries.

The management device may receive content items from each of one or more content clients, such as advertising clients, advertising networks, or agents of an entity that provide digital content for rendering on one or more digital display devices, that the content client desires to have displayed on one or more display devices. Each content item includes video images, audio files, and/or software code configured for execution by a computing device, such as a processor of a display device, in order to generate video images, such as video images including virtual objects, with which a user may interact. Content items may include any number of video, audio, and/or image files that are selectively rendered by respective digital display devices according to software code that is also includes as part of the content item, such as in response to user interactions with virtual objects that are rendered by the digital display devices. The content items may be related to one or more of advertising, education, entertainment, and/or any other purpose for which a content client desires to display the content item.

In one embodiment, content items may include associated content display parameters that indicate parameters for display of the content item on each of one or more particular display devices, types of display devices, geographical locations, etc. Thus, the same content item may be rendered in different manners based on the size of the display device on which the content item is rendered, for example. The content item may also include interaction rules regarding how interactions between users near display devices and virtual objects displayed on the respective display devices affect operation of the display device. For example, interaction rules of a particular content item may indicate changes to the rendered content item in response to user interactions with respective portions of video images, such as virtual items, that are displayed on a display device as part of the content item.

In one embodiment, the interactive display management device manages content of digital display devices across multiple networks, including multiple heterogeneous display devices. In one embodiment, certain display devices are interactive, such as an interactive display device that includes one or more cameras and/or projectors. In one embodiment, the display management system may also selectively issue commands to respective display devices, such as in response to input received from one or more content clients associated with a particular display device and/or content item(s) rendered on the display device, and may distribute content items to the network of digital displays.

In one embodiment, the display management device receives interaction data from at least some of the display devices. Interaction data may include indications of interactions that users have had with virtual objects of the content item(s), possibly from multiple content providers. Interaction data from multiple display devices may be analyzed by the display management device and changes and/or updates to one or more display schedules (also referred to herein as "playlists") for display devices may be based at least partly on the interaction data.

FIG. 1A is a block diagram illustrating one embodiment of a display management system 100 including an interactive display management device 120 (or simply "management device 120") in communication with a plurality of interactive display devices 140 (also referred to herein as "display devices 140"), including interactive display devices 140A, 140B, 140C, and any number of additional interactive display devices 140, via a network 160. In this embodiment, the interactive display management device 120 transmits content data (where content data includes one or more content items), scheduling information, and/or commands to each of the interactive display devices 140. The interactive display devices 140 are each configured to render content items for display to users and/or interaction with users. The content items may include advertising, educational, informational data, and/or any other type of video content, that is displayed to shoppers at a mall, customers at a movie theater, or visitors to a museum or library, for example. In one embodiment, certain of the display devices are configured to detect interactions (e.g., touch, or near touching or pointing to a particular portion of a display surface or performing gestures with a finger, hand, and/or other portion of the user's body and/or other objects) with virtual objects of the displayed content items in order to customize subsequent video images that are rendered on the display device (see discussion of FIG. 4, below, for an example of an interactive display device). Depending on the embodiment, the display devices may include any display that may be interacted with by a user, such as a projector or other image projection device, a camera or other light detectors, a CRT, TV, LEDs, OLEDs, plasma screens, or other display technologies.

The interaction data from each of the interactive display devices 140 may be intermittently transmitted to the interactive display management device 120, which may analyze the interaction data and update the content items, playlists, and/or commands for one or more of the interactive display devices 140. For example, if the interaction data from display device 140A indicates that a particular content item was repeatedly interacted with in a certain manner, the interactive display management device 120 may be configured to adjust the playlist of interactive display device 140B and/or interactive display device 140C to cause those interactive display devices to display the particular content item less or more frequently. Depending on the embodiment, the network 160 may include one or more of any suitable communication network, such as one or more LAN, WAN, and/or the Internet, for example. The devices 120, 140, and other devices described herein, may communicate via the network 160 using one or more wired and/or wireless communication mediums.

In one embodiment, the one or more content clients also communicate with the interactive display management device 120 via the network 160. The content clients may transmit content items, scheduling rules, commands, and/or any other data that might be used in controlling or monitoring display of video data and/or interactions with displayed video data on one or more interactive display devices 140. For example, a content client may upload content items to the management device 120 (or otherwise make the content items available), such as a software application that presents interactive advertising content that is responsive to interactions with rendered virtual objects. In one embodiment, the content clients may access information regarding their respective content items, playlists including those content items (possibly including indications of other content items associated with other content clients), and/or interactions with content items, and/or provide further content items to the management device 120 via one or more Internet-accessible interfaces, such as interfaces that are renderable in one or more browser, for example. Depending on the embodiment, content clients may communicate with the management device 120 via one or more standalone software applications that are executed on computing devices of the content client, and/or by transmitting data to the management device 120 via any other electronic communication medium and protocol, such as file transfer protocol (FTP), Hypertext Transfer Protocol (HTTP), email, or short messaging service (SMS), for example.

Figure 1B:
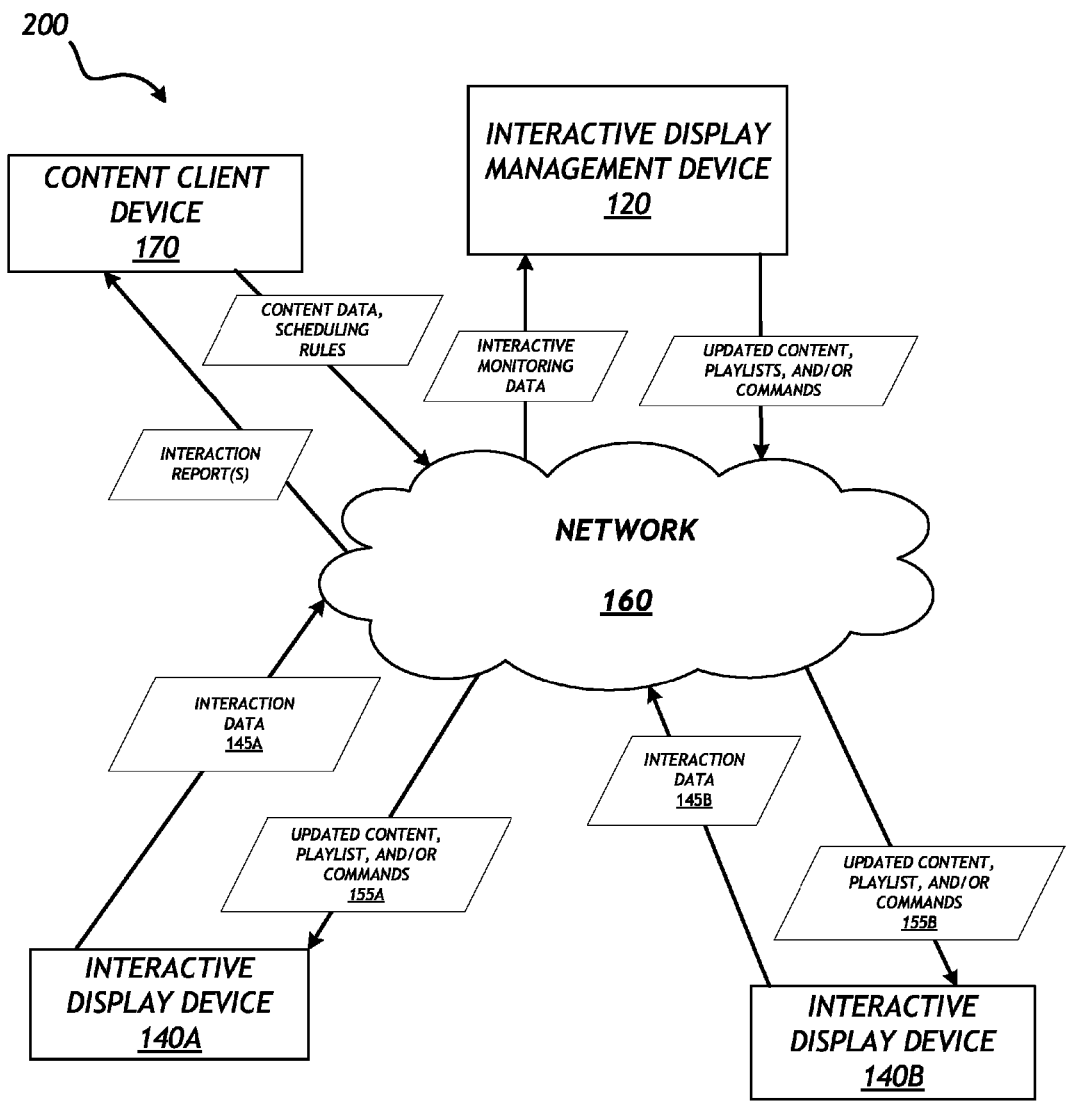
FIG. 1B is a block diagram illustrating one embodiment of a display management system including the interactive display management device of FIG. 1A in communication with a content client device, as well as the interactive display devices of FIG. 1A.

FIG. 1B is a block diagram illustrating an interactive display management system 200, including the interactive display management device 120 in communication with the interactive display device 140A and the interactive display device 140B via the network 160. FIG. 1B also illustrates one example of data that may be communicated between the interactive display management device 120 and respective interactive display devices 140. In embodiment of FIG. 1B, a content client device 170 (also referred to as a "content client") is shown in communication with the interactive display management device 120 and/or one or more of the interactive display devices 140 via the network 160. FIG. 1B illustrates an example flow of data between the devices. Depending on the embodiment, the data transmitted between the devices 120, 140, and/or 170 may be transmitted in any available medium according to any suitable communication protocol.

In the embodiment of FIG. 1B, the content client 170 transmits content data, such as one or more content items, and/or scheduling rules to the interactive display management device 120. Depending on the embodiment, the content data may be maintained on a storage device of the content client device 170 (either local or remote to the management device 120), may be transmitted to the management device 120, and/or may be transmitted and stored on a another storage device, such as a third-party media storage device. The content data may include any combination of video and audio data (or software code that generates video and/or audio data), including one or both of real-world video and audio data, such as video images recorded by a high definition video recording device, computer generated data, and/or combination of real world and computer-generated data.

In operation, the interactive display management device 120 transmits updated content items, playlists, and/or commands to each of the interactive display devices 140, as necessary. For example, in the embodiment of FIG. 1B, updated content items, a playlist, and/or commands 155A is transmitted to interactive display device 140A, while updated content, schedule, and/or commands 155B is transmitted to interactive display device 140B. Thus, management device 120 may customize the content items and playlist, for example, that is transmitted to each interactive display device 140, such as in order to suit the needs of one or more content clients (e.g., terms in an advertising contract between the operator of the display management device 120 and an operator of the content client device 170). For example, the data 155A transmitted to the interactive display device 140A may include a first content item from the content client 170 (or some other content client) for display on the display device 140A, while the data 155B transmitted to the display device 140B includes a second content item from the content client 170 (or some other content client) for display on the display device 140B.

In one embodiment, the content client device 170 provides scheduling rules to the management device 120 that are used by the management device 120 to determine where, when, and how content items are displayed. For example, the content client 120 may indicate scheduling rules for a particular content item, or multiple content items, that includes rules related to dayparting (e.g., the time of day when the content items should or must be displayed), location information that indicates general and/or specific geographic locations (e.g., one or more ZIP code areas), a particular type of location where the content item should or must be displayed (e.g., a mall, a department store, a university, etc.), limitations on adjacent content (e.g., content before and/or after a particular content item), such as an indication that content items within one or more classes or associated with one or more specific content clients may not be displayed within a specific time before or after the content item, a particular class and/or particular display device(s) on which the content may or may not be displayed, and/or rules that define weather, current events, and/or demographics of areas around display devices that must match corresponding predefined thresholds before the content item(s) are transmitted to the corresponding display device.

The data 145, 155 that is downloaded to and uploaded by display devices 140 may be transferred over the network 160 in an incremental manner, such that the amount of data that needs to be transferred is reduced and network bandwidth may be reduced. For example, the management device 120 and a particular display device 140 may initially compare directory trees, file timestamps, and/or file hashes, for example, associated with data (e.g., content items or playlists for the particular display device) that is to be common on both devices, in order to determine the specific differences between the data stored on the two device, and only transmit the files and/or portions of files, that have been updated or added since the last incremental update.

The interactive display devices 140A, 140B, which may comprise different types of display devices, are each configured to detect interactions with users. A user may include a visitor, customer, or student, for example, that interacts with a display device 140. Thus, if the display device 140A is positioned in a shopping center, users may include customers that are shopping in the shopping center. In one embodiment, the interactive display devices 140 transmits certain or all of the interaction data representing interactions between displayed content items, or more specifically between virtual objects displayed as part of the content items, and one or more users. The interaction data may include data indicating counts of each of certain interactions and/or types of interactions, how users interact with respective virtual object, how long users interact with various virtual objects, etc. In the embodiment of FIG. 1B, the interactive display device 140A transmits interaction data 145A to the management device 120 and interactive display device 140B transmits interaction data 145B to the management device 120.

The interactive management device 120 is advantageously configured to receive interaction data from each display device 140, to analyze the interaction data, such as with reference to scheduling rules from respective content client devices 170, and to determine adjustments to playlists, including the particular content items and/or content display parameters associated with the content items, for display devices 140. In one embodiment, the management device 120 receives and/or compiles interaction data associated with content items from a particular content client device 170 from multiple display devices 140. Thus, the management device 120 may make playlist adjustments to display devices not just based on the interaction data from a single display device, but based on interaction data from multiple display devices 140.

As illustrated in FIG. 1B, the management device 120 transmits updated content items, playlists, and/or commands to the interactive display devices 140.

In one embodiment, the management device 120 generates and provides the content client device 170 with access to interaction reports that include data regarding interactions with the content items of the content client 170, and possibly other reports associated with the content items of the content client 170 (and possibly of other content clients). In one embodiment, an interaction report indicates the interactions with a particular content item and compares those interactions with interactions with other content items, such as other content items of the content client 170 and/or content items of other content clients 170. For example, an interaction report may indicate interactions with a particular content item of a content client 170, as well as a comparison of the interactions with other content items rendered by the particular display devices 140 and/or other display devices. Thus, an interaction report may include data that allows the content client 170 to determine how interactive a particular content item is in relation to other content items and, accordingly, may be useful in determining which content items should be displayed less, additionally, and/or that may benefit from updating.

Figure 2:
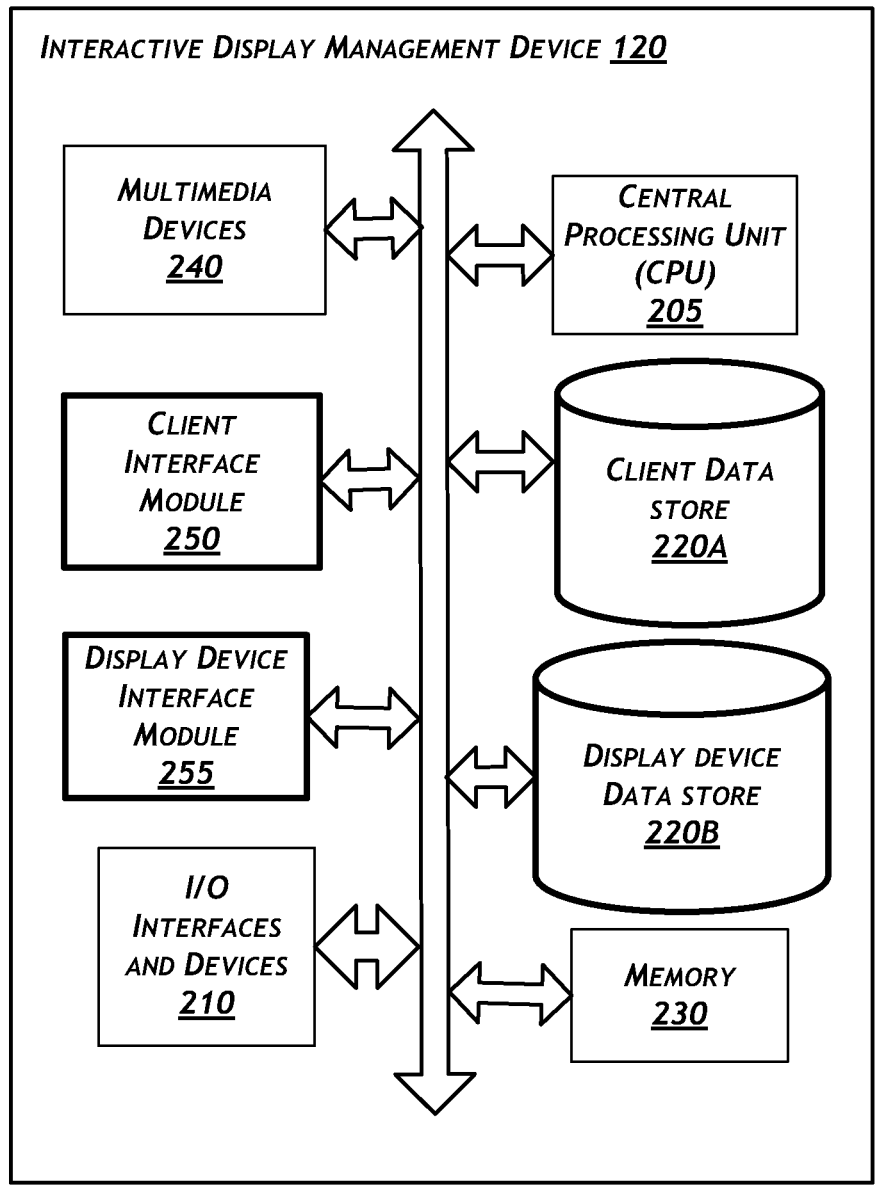
FIG. 2 is a block diagram illustrating one embodiment of the interactive display management device of FIGS. 1A and 1B.

FIG. 2 is a block diagram illustrating one embodiment of the interactive display management device 120 of FIGS. 1A and 1B. The interactive display management device 120 may be used to implement certain systems and methods described herein. The functionality provided for in the components and modules of the interactive display management device 120 may be combined into fewer components and modules or further separated into additional components and modules. The interactive display management device 120 may further comprise human personnel that interact with the computing device(s) of the interactive display management device 120.

In one embodiment, the interactive display management device 120 comprises, for example, one or more servers or personal computers that are IBM, Macintosh, or Linux/Unix compatible. In another embodiment, the interactive display management device 120 comprises a laptop computer, smart phone, personal digital assistant, or other computing device. In one embodiment, the interactive display management device 120 includes one or more central processing units ("CPU") 205, which may include conventional or specific-purpose microprocessors. In one embodiment, the interactive display management device 120 includes computer readable storage medium including one or more memories 230, such as random access memory ("RAM") for temporary storage of information, a read only memory ("ROM") for permanent storage of information (not shown), and one or more mass storage devices 220 (including mass storage devices 220A and 220B of illustrative FIG. 2), such as a hard drive, diskette, optical media storage device, and/or USB flash drive. In certain embodiments, the mass storage device 220 stores information for each of a plurality of content clients 210. Typically, the modules of the monitoring system are in communication with each other via a standards based bus system. In different embodiments, the standards based bus system could be Peripheral Component Interconnect (PCI), Microchannel, SCSI, Industrial Standard Architecture (ISA), and Extended ISA (EISA) architectures, for example.

The interactive display management device 120 is generally controlled and coordinated by operating system software, such as Windows 95, 98, NT, 2000, XP, Vista, 7; SunOS; Solaris; Blackberry OS, or other compatible operating systems. In Macintosh systems, the operating system may be any available operating system, such as MAC OS X. In other embodiments, the interactive display management device 120 may be controlled by any other suitable operating system, such as a proprietary operating system. Conventional operating systems control and schedule computer processes for execution, perform memory management, provide file systems, networking, and I/O services, and/or provide a user interface, such as a graphical user interface ("GUI"), among other functions.

The illustrative interactive display management device 120 may include one or more commonly available input/output (I/O) interfaces and devices 210, such as a keyboard, mouse, touchpad, and printer. In one embodiment, the I/O interfaces and devices 210 include interfaces to one or more display devices, such as a monitor, that allow the visual presentation of data to a user. More particularly, a display device provides for the presentation of content items, such as video images including, GUIs, menus, icons, animations, application software data, and multimedia presentations, for example. In one embodiment, the I/O interfaces and devices 210 comprise devices that are in communication with modules of the interactive display management device 120 via a network, such as the network 160 or any local area network, including secured local area networks, or any combination thereof. The interactive display management device 120 may also include one or more multimedia devices 240, such as speakers, video cards, graphics accelerators, and microphones, for example.

In the embodiment of FIG. 2, the interactive display management device 120 also includes application modules that may be executed by the CPU 205. Each of these application modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. A software module may be complied and linked into an executable program, installed in a dynamic link library, or may be written in an interpreted programming language such as, for example, BASIC, Java, Perl, or Python. It will be appreciated that software modules may be callable from other modules or from themselves or may be invoked in response to detected events and interrupts, or both. Software modules may be embedded in firmware, such as an EPROM. A "module" may alternatively or additionally refer to logic embodied in hardware or firmware. For example, hardware modules may comprise connected logic units, such as programmable gate arrays or processors. Thus, the modules described herein may be represented in software, hardware, and/or firmware.

The application modules of the illustrative interactive display management device 120 include a client interface module 250 and a display device interface module 255. In general, the client interface module 250 is configured to interface with one or more content client devices 170 (FIG. 1B). For example, a client interface module 250 may generate one or more user interfaces that are provided to the content client 170 in order to allow the content client 170 to provide content data and/or scheduling rules to the management device 120. Additionally, the client interface module 250 may generate interaction reports, among other reports, that may be delivered to the content client device 170, such as via e-mail, portable document format (PDF), or via an Internet accessible user interface, for example. In the embodiment of FIG. 2, a client data store 220A, which may include one or more mass storage devices, stores the content items and/or scheduling rules from one or more content clients 170. Depending on the embodiment, the client data store 220A may store the actual content items for respective content clients, scheduling rules for particular content clients, content items, or groups of content items, for example, and other data from the content clients that might be used to manage playlist scheduling by the interactive display management device 120. In one embodiment, the client interface module 250 also includes one or more administrator user interfaces that interface with administrator(s) to create, change, alter permissions for, and/or delete specific content client accounts and/or content items associated with content clients. An administrator user interface may allow administrators to modify data or issue commands in a given content client's account through an interface such as client user interface. In one embodiment, content clients and/or administrators may define ad-hoc services and custom monitoring that can change display parameters of a particular content item while the content item is being rendered by one or more display devices. For example, a content client and/or administrator may be able to generate an affidavit report that lists and timestamps every instance of a given piece of content running on any display device in the system, or a selected group of display devices. These reports may be designed to generate alerts in order to draw the attention of the content client and/or administrator to a particular problem or situation. For example, an alert may be generated if the frame rate for a particular content item drops below a particular value. Such ad-hoc services and custom monitoring queries may be defined using SQL code, for example.

The management device 120 also includes a display device interface module 255 that is configured to interface with each of a plurality of interactive display devices 140 (FIGS. 1A, 1B). For example, the interface module 255 may generate data packages for delivery to respective interactive display devices 140 that include content items for display (or indications of locations of content items for display), playlists (or playlist updates), commands, and/or any other information that might be useful to the interactive display device. The display device interface module 255 may be configured to define groups of display devices 140, such as based on scheduling rules from one or more content clients 170, and define and/or update playlists for given display devices 140 or groups of display devices 140, including defining media rotations that allow inventory to be sold with stock content filled in as appropriate.

Additionally, the display device interface module 255 receives interaction data from the respective display devices 140. As discussed above, interaction data may include various types and formats of data regarding interactions with particular content items and/or groups of content items, and comparisons of interaction data associated with certain content items. In the embodiment of FIG. 2, a display device data store 220B stores information associated with respective interactive display devices, such as playlists and/or interaction data for respective display devices 140. In one embodiment, the display device interface module 255 analyzes the interaction data of one or more display devices 140 in order to determine updates to playlists for one or more display devices 140. For example, if a particular content item does not satisfy a scheduling rule (e.g., the content item was not interacted with enough during a particular time window) the display device interface module 255 may adjust the playlists for one or more display devices 140 that are then scheduled to render the particular content item (e.g., the playlists may be adjusted to render the particular content item during a different time window or not at all).

Figure 3:
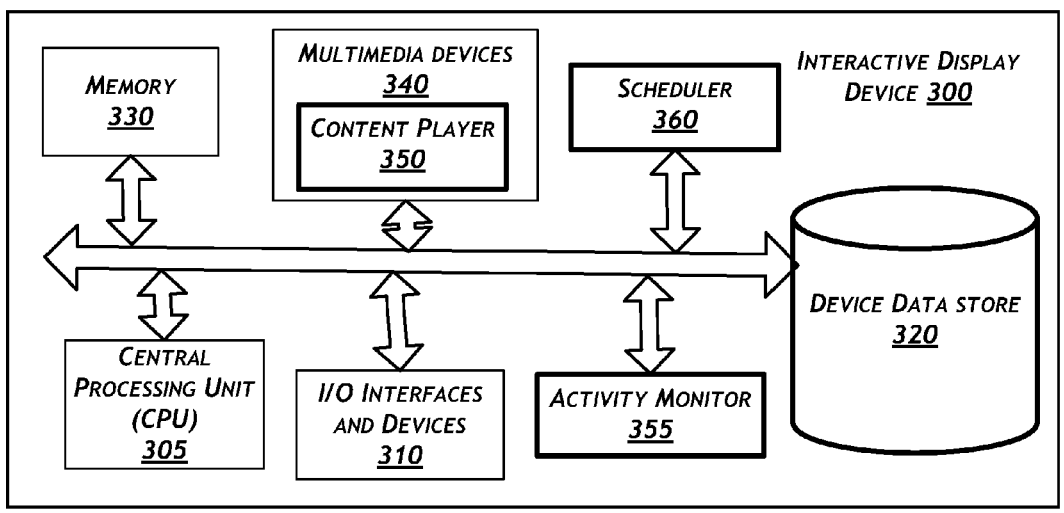
FIG. 3 is a block diagram illustrating one embodiment of an interactive display device, such as the interactive display devices of FIGS. 1A and 1B.

FIG. 3 is a block diagram illustrating one embodiment of an interactive display device 300, such as the interactive display devices 140 of FIGS. 1A and 1B. The interactive display device 300 may be used to implement certain systems and methods described herein. The functionality provided for in the components and modules of the interactive display device 300 may be combined into fewer components and modules or further separated into additional components and modules. The interactive display device 300 may further comprise human personnel that interact with the computing device(s) of the interactive display device 300.

The illustrative interactive display device 300 includes one or more central processing units 305 and one or more memories 330, such as random access memories and/or read only memories, one or more I/O interfaces and devices 310, and one or more mass storage devices, such as the device data store 320. The central processing unit 305, memory 330, and I/O interfaces and devices 310 may include any suitable devices, such as those described above with respect to FIG. 2, respectively, central processing unit 205, memory 230, and I/O interfaces and devices 210. The interactive display device 300 includes multimedia devices 340, which made include any of the media devices discussed above with reference to multimedia devices 240, and additionally comprises a content player module 350, also referred to herein as "the content player 350"). The illustrative interactive display device 300 includes two additional application modules that are executable by the CPU 305, namely, a scheduler 360 and activity Monitor 355.

In general, the content player 350 is configured to generate a video output comprising video images for display by the display device 300. For example, in one embodiment the content player 350 generates video output at a predetermined or adjustable frame rate (e.g., 20, 30, 40, 50, or 60 frames per second) that is transmitted to a projection device, such as a digital movie projector, for projection onto a display surface, such as a display screen, floor, wall, or other surface. The video output may be customized depending on the specifications of the particular display device. For example, video output for a projector may be formatted differently (e.g., a different frame rate and/or resolution) then a video output of the same content item for a touchscreen display. Thus, in one embodiment the content player 350 of the display device 300 is configured to render video output for display on the particular display hardware of the display device 300. In one embodiment, the content player initiates execution of content items in the form of software code via the CPU 305 and generates corresponding video images for display by the display device 300. The content player 350 may also be configured to render video and/or audio files in various formats, such as AVI, MPEG, VCD, DVD, WMV, ASF, MP4, 3GP, DivX, XviD, DAT, RM, RMVB, MOV, QT, M4V, FLV, MKV.

Figure 4:
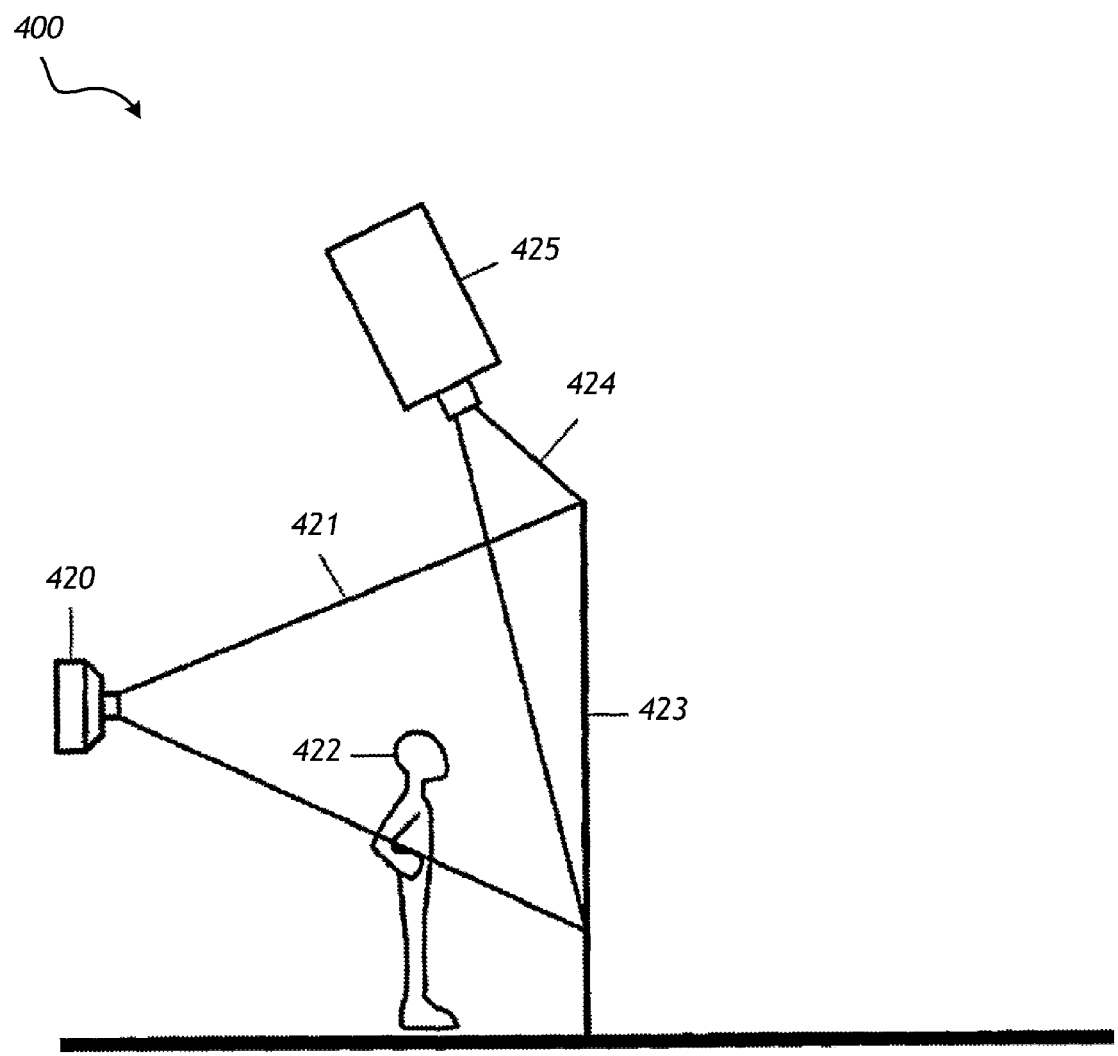
FIG. 4 is a diagram illustrating one embodiment of a display device and a user interacting with the display device.

The activity monitor 355 is generally configured to detect interactions of users with the interactive display device 300, such as based on one or more inputs from other multimedia devices and/or I/O interfaces and devices 310. For example, if the display device 300 comprises a touch sensitive display screen, the activity monitor 355 may detect interactions of the user with certain virtual objects then displayed on the touch sensitive display screen in response to information received from the touch sensitive display screen, such as screen location(s), duration, pressure, and/or repetition, etc. associated with the user's interaction. Similarly, if display device 300 comprises a camera that records images of at least a portion of a user interacting with a screen onto which video images are being projected, such as by a projector, the activity monitor 355 may be configured to analyze the recorded images from the camera and determine when an interaction with a virtual object of the video images has occurred. In one embodiment, the activity monitor 355 may determine gestures performed by the user based on a series of interactions with a display screen, for example, such as a user moving a finger in a predefined pattern across a touch sensitive display screen or moving a hand (or other body part) in a certain pattern in front of a camera that records images of the user. FIG. 4, described in detail below, describes the operation of an illustrative content player 350 and activity monitor 355 in rendering video images for display to users and detecting interactions of the user with portions of the video images.

In one embodiment, the activity monitor 355 records logs that include data indicating the starting and ending time and identification for content items that were rendered on the display device, frame rate, memory usage, and/or application errors and warnings, for example. The logs may include system metrics, such as available disk space in memory, frame rates, display status, display problems such as overheating or component failure, raw and analyzed images from webcams or vision systems, application status, and/or display errors. The activity monitor 355 may use such logs and interaction data to generate alerts and reports. The alerts and reports may be custom defined, for example the custom definition may be defined by code entered into a web interface using languages such as SQL, or by entering a specific item of monitoring data and an associated threshold for alerting.

The scheduler 360 is generally configured to receive a playlists and/or updates to playlists from the management device 120, maintains the appropriate content data on a device data store 320, and initiate rendering of respective display items at the appropriate times (e.g., the time indicated in the playlist) or in response to a particular condition (a certain interaction with a first content item may trigger rendering of a second content item by a display device). In one embodiment, the scheduler 360 may be configured to update the playlist based on one or more user interactions with the display device 300, commands from the management device 120, and/or based on scheduling rules from a content client 170. Thus, in one embodiment the display device 300 is configured to update a playlist for the display device 300 according to scheduling rules established by one or more content clients, for example, rules based on interaction data of the interactive display device 300. The scheduler 360 may also be configured to upload content items to one or more other devices, such as other display devices 140, and/or perform quality assurance testing on content items.

The device data store 320 is configured to store content items and/or location information of content items, content display parameters associated with respective content items, scheduling rules for particular content items, and/or interaction data associated with respective content items.

FIG. 4 is a diagram illustrating one embodiment of a display device 400 and a user 422 interacting with the display device 400. In this embodiment, the display device 400 includes a projector 425 that is positioned at an oblique angle to a display screen 423 to create a light cone 424. The projector 425 is configured to display video images on the display screen 423, such as video images that are rendered by the content player 350 (FIG. 3). The display device 400 further comprises a camera 420, such as a digital video camera, that captures digital images of at least a portion of the user 410 and at least a portion of the display screen 423. In the embodiment of FIG. 4, the positions of the projector 425 and the camera 420 are such that the occurrence of shadows obstructing the image by the projector 425 is reduced. In another embodiment, the camera 420 and a video projector 425 can be in the same location and pointed in the same direction. In another embodiment, the camera 420 and projector 425 can be pointed at a wall as shown in FIG. 4, pointed at the ground, redirected with a mirror, or pointed at any other surface. Alternatively, the projector 425 could be placed behind the display screen 423 so that the user is no longer in the way of the projection and, thus, no shadows are cast on the display screen 423. Shadow may also be reduced by placing the projector 425 at an oblique angle to the screen, such as is illustrated in FIG. 4. In other embodiments, the projector 425 and/or camera 420 may be positioned at different angles, such as to display and detect interactions with video images projected on a floor. Another example of an interactive display device is described in U.S. patent application Ser. No. 12/100,737 for a "Display Using a Three-Dimensional Vision System, which is hereby incorporated by reference in its entirety.

In one embodiment, the live images from the video camera 420 are processed in substantially real-time in order to separate mobile objects (e.g. people) from the static background, regardless of what the background is. The processing can be done as follows: first, input frames from the video camera may be converted to grayscale to reduce the amount of data and to simplify the detection process. Next, the converted input frames may be blurred slightly to reduce noise. In one embodiment, any object that does not move over a long period of time is presumed to be background; therefore, the system is able to eventually adapt to changing lighting or background conditions. In one embodiment, a model image of the background can be generated by numerous methods that examine the input frames over a range of time, for example. In one method, the last several input frames (or a subset thereof) are examined to generate a model of the background, either through averaging, generating the median, detecting periods of constant brightness, or other heuristics, for example. The length of time over which the input frames are examined determines the rate at which the model of the background adapts to changes in the input image.

An object of interest, e.g., a portion of a user's body, is presumed to differ in brightness from the background. In order to find objects, the current video input may be subtracted from the model image of the background. In this embodiment, if the absolute value of this difference at a particular location is larger than a particular threshold, then that location is classified as an object; otherwise, it is classified as background.

In one embodiment, a computing system associated with the camera accesses the object/background classification of an image (possibly in addition to other data) as input, and outputs a video image based on this input, possibly in real time. Software that performs this functionality can take on an infinite number of forms, and is thus as broadly defined as a computer application. For example, this component could be as simple as producing a spotlight in the shape of the detected objects, or as complicated as a paint program controlled through gestures made by people who are detected as objects. In addition, applications could use other forms of input, such as sound, temperature, keyboard input etc. as well as additional forms of output, such as audio, tactile, virtual reality, aromatic, etc.

In one embodiment, objects detected by the camera and/or associated computing device are able to interact with virtual objects of the video images displayed on the display screen 423. For example, an interactive content item showing a group of ducklings could be programmed to follow behind any real object (e.g. a person) that walks in front of the display. As another example, computer games that can be played by people moving in front of the camera form another class of interactive content items.

Figure 5:
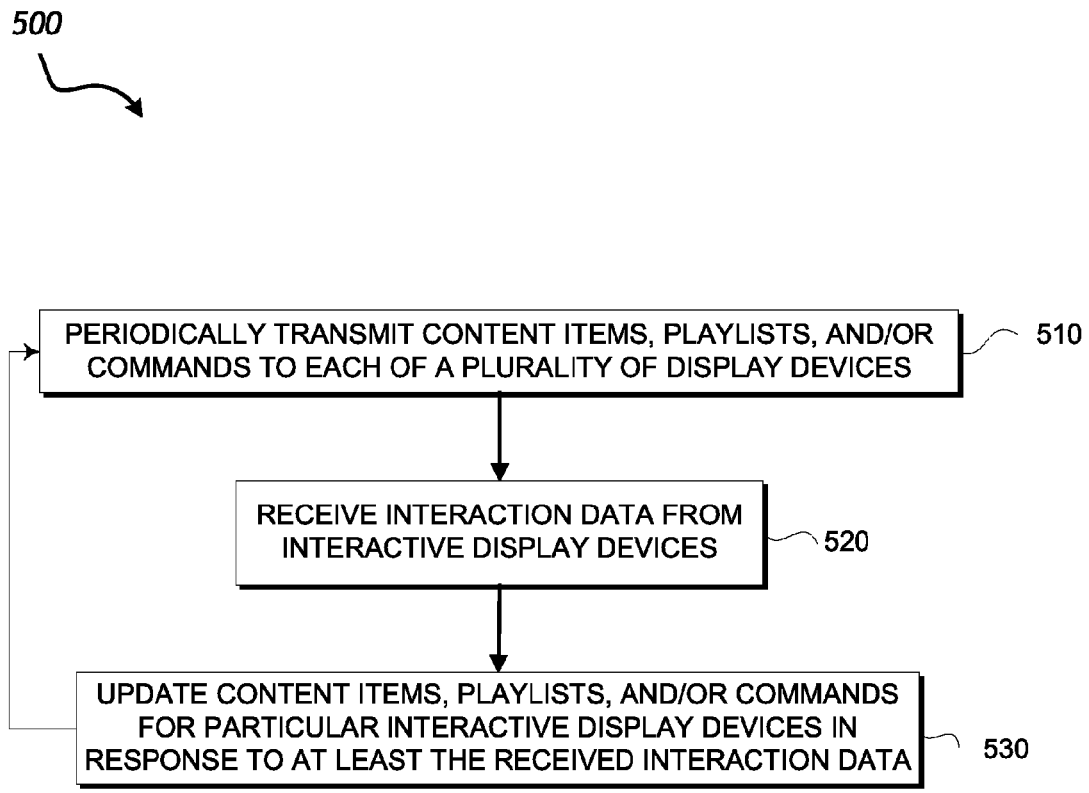
FIG. 5 is a flowchart illustrating one embodiment of a method of monitoring and updating video data displayed on one or more interactive display devices based at least upon interaction data from one or more of the display devices.

FIG. 5 is a flowchart illustrating one embodiment of a method 500 of monitoring and updating video data displayed on one or more interactive display devices based at least on interaction data from one or more of the interactive display devices 140. In one embodiment, the method of FIG. 5 is performed by the interactive display management device 120 and/or one or more interactive display devices 140. Depending on the embodiment, the method of FIG. 5 may include fewer or additional blocks and blocks may be performed in a different order than is illustrated.

Beginning in block 510, the interactive display management device 120 intermittently transmits content items, playlists, and/or commands to each of the interactive display devices. As described above, the content items for display on display devices may be transmitted for storage at the interactive display device 140 or may be stored elsewhere that is accessible to the display devices 140, such as in response to a display device providing authentication information to the storage device. The playlist may include a list of content items to be rendered by a particular display device, as well as one or more display parameters for each of the content items and/or for multiple content items. The data transmitted to the display devices 140 may include scheduling rules, such as portions or all of the scheduling rules that are received from one or more content clients, that indicate criteria for adjusting a playlist of a respective display device 140, such as in response to certain interaction data at a particular display device.

Next, in block 520, interaction data is received from multiple interactive display devices 140. Interaction data generally indicates interactions between a user and one or more video images and/or specific virtual objects rendered in the video images. Interaction data may be in various formats, such as in a log format that indicates each interaction between a user and an interactive display device, along with a time of each interaction and possibly other information regarding each interaction, or in one or more summary formats that indicate different combinations of the interaction data, such as a total number of a particular interaction during a predetermined time period. In other embodiments, the interaction data may include any other information related to interactions with the content items rendered on a display device and/or content items displayed on other display devices.

Moving to block 530, based on the received interaction data, and possibly on other data such as the scheduling rules from one or more content clients 170, the interactive display management device 120 determines if updates to the content items, playlists, and/or commands should be made for any of the one or more display devices 140 in the interactive display network.

Figure 6:
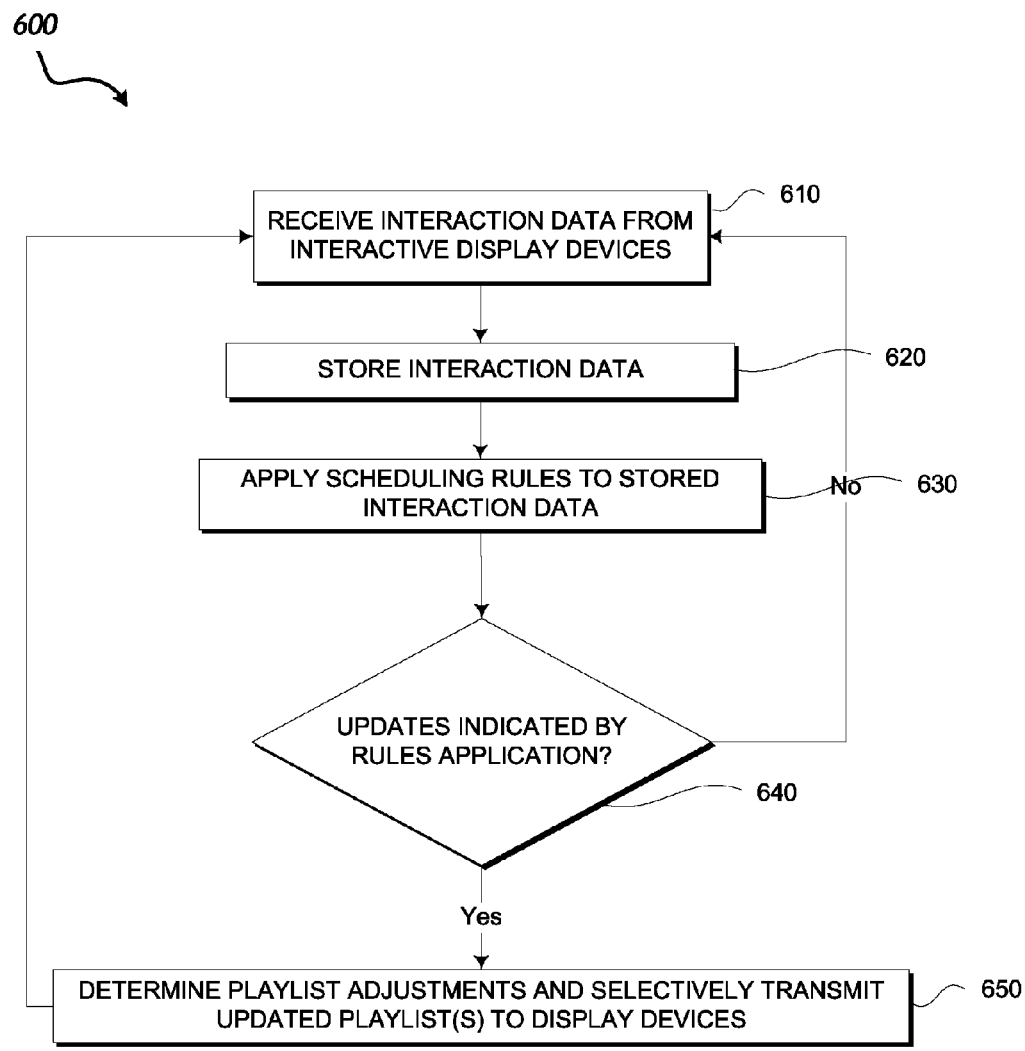
FIG. 6 is a flowchart illustrating one embodiment of a method of receiving interaction data and updating scheduling information of one or more display devices in response to scheduling rules of one or more content clients.

FIG. 6 is a flowchart illustrating one embodiment of a method of receiving interaction data and updating playlists of one or more display devices 140 of an interactive management system in response to scheduling rules of one or more content clients 170. Depending on the embodiment, the method of FIG. 6 may include fewer or additional blocks and/or the blocks may be performed in a different order than is illustrated.

Beginning in block 610, the interactive display management device 120 receives interaction data from one or more interactive display devices 140, such as is described above with reference to block 520 of FIG. 5. Next, the interaction data from the one or more display devices 140 is stored on one or more storage devices, such as on display data store 220 of interactive display management device 120 (FIG. 2). In one embodiment, the interaction data may be stored in various data structures and/or formats. For example, in one embodiment the interaction data from multiple display devices may be stored such that all interaction data associated with a particular display device 140, including interactions with content items from different content clients, may be accessed. In one embodiment, the interaction data from multiple display devices 140 is stored such that all interaction data associated with a particular content item, multiple content items, and/or content clients may be retrieved and analyzed. In one embodiment, data associated with each display device 140 is stored in a separate data structure, wherein data structures may be of different formats depending on the particular content clients, for example. Thus, interactions between the content clients and the interaction data stored may be simplified by storing the interaction data in a format that is easily usable by the particular content client device 170. The interaction data may be stored in one or more local storage devices and/or networked storage device.

Next, in block 630 scheduling rules of one or more content clients are applied to at least the interaction data. For example, substantially real-time interaction data may be received by the interactive display management device 120 and may be provided to one or more content client device 170 in a substantially real-time manner, such as via one or more Internet-accessible user interfaces, for example. In this embodiment, scheduling rules for a particular content client and/or particular content item may be applied to the real-time interaction data associated with the content item in order to determine if the scheduling rules are currently satisfied. For example, a particular content item may require a predetermined minimum quantity of interactions with the content item, and/or with particular virtual objects of the content item, in order to continue rendering of the content item (in some embodiments, the content client pays for rendering of the content item based on the amount of time the content item is displayed on one or more display devices and, thus, may not want to pay for continued rendering of the content item if the content item is not being sufficiently interacted with by users). Thus, if the particular content item has not met the predetermined minimum user interaction threshold, the application of the rules on the interaction data would indicate that the minimum threshold has not been met.

Similarly, scheduling rules of multiple content clients may be applied to the interaction data, such as scheduling rules of each content client for which content items are scheduled over a predetermined future time. As noted above, scheduling rules may include limitations on adjacent content items, such that the scheduling rules of content items that are scheduled for rendering in the future may be relevant to the current content item on the playlist. For example, if a current content item triggers a scheduling rule for a later scheduled content item, e.g., the current content item is being rendered too close in time to the later scheduled content item, the interactive display management device 120 detects triggering of the scheduling rule. Additionally, scheduling rules may consider interaction data from multiple display devices 140, such as interaction data associated with multiple content items associated with a particular content client that are rendered on multiple display devices 140. For example, a particular content item of a content client may be rendered on display devices 140 in multiple states, countries, types of locations, etc., and the interactive display management device 120 may compile the interaction data for all of the display devices 140 on which the particular content item has been rendered and/or is scheduled to be rendered, possibly within a predetermined time. Thus, the scheduling rules of the content client may also include minimum and/or maximum rendering time quantities for a particular content item or group of content items, across multiple display devices 140, locations, location types, and/or any other criteria.

Moving to block 640, the interactive display management device 120 determines if updates to playlists of one or more display devices 140 is indicated by the application of scheduling rules. If updates to playlists are indicated, the method continues to block 650 where the interactive management device 120 determines playlist adjustments and selectively transmits updated playlists, and/or portions of playlists, to respective display devices 140.

Figure 7:
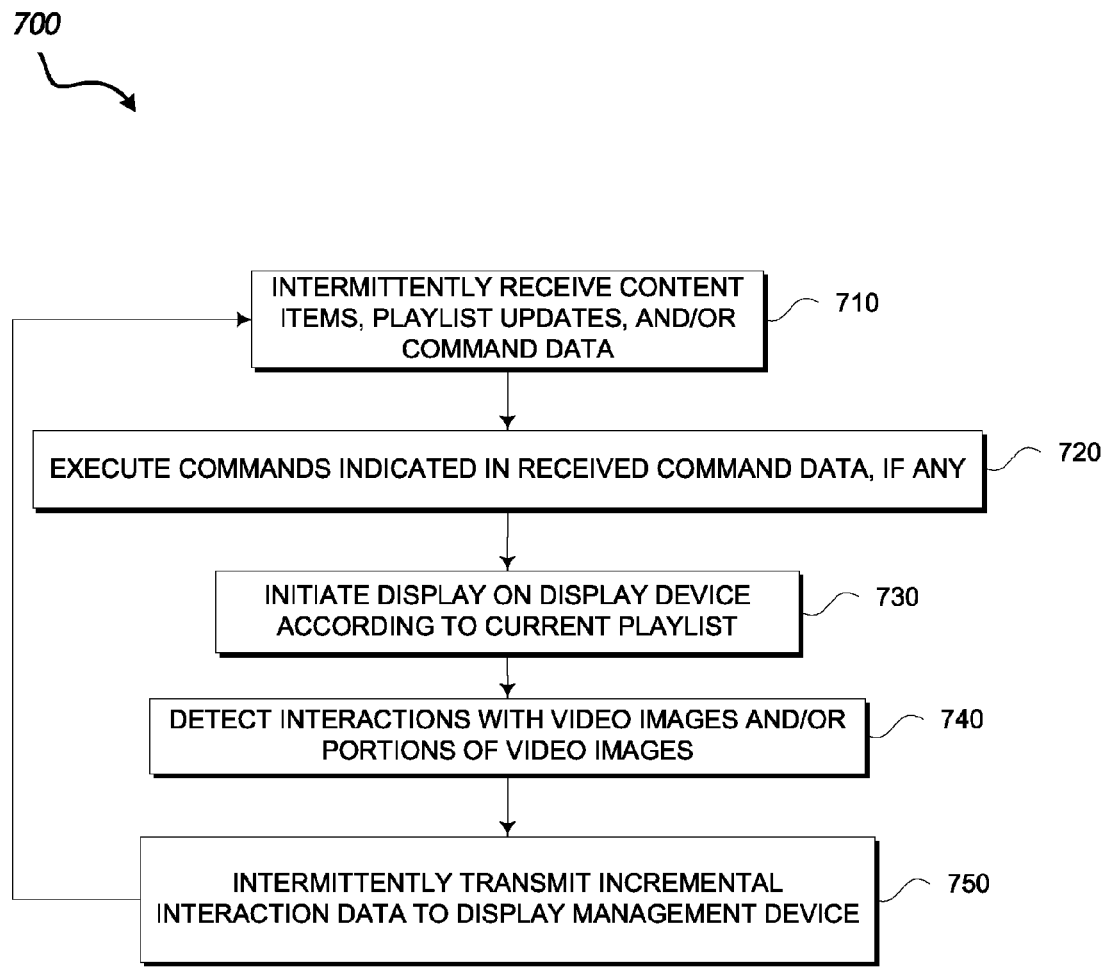
FIG. 7 is a flowchart illustrating one embodiment of a method that may be performed by a display device in order to receive data from an interactive display management device and provide at least interaction data to the display management device.

FIG. 7 is a flowchart illustrating one embodiment of a method that may be performed by a display device 140 in order to receive data from an interactive display management device 120 and provide at least interaction data to the display management device. Depending on embodiment, the method of FIG. 7 may include fewer or additional blocks and/or the blocks may be performed in a different order than is illustrated.

Beginning in block 710, the display device 140 intermittently receives content items, playlist updates, and/or command data from the interactive display management device 120. In one embodiment, content items are transmitted on a regular schedule, such as nightly at a particular time when bandwidth for transfer of large content items is more easily accessible. Similarly, playlists may be transmitted on a predetermined schedule, such as once every hour, six hours, or days, for example. In some embodiments, content items, playlists (or playlist updates), and/or command data may be transmitted on an as needed basis or upon request from the display device 140. For example, if the interactive display management device 120 determines that a playlist update is needed, such as in response to application of one or more scheduling rules on real-time interaction data from one or more display devices 140, updated playlist information may be received by the interactive display device 140 outside of a normal schedule (or there may not be a normal schedule such that playlist updates are only transmitted when updated).

In block 720, the display device executes commands indicated in the received command data, if any. Commands may be entered by a content client and/or administrator, in order to cause a particular display device and/or one or more display devices that execute a particular content item or content items, to perform an associated function. For example, a content client may issue a command indicating that all renderings of a particular content item are to be stopped as soon as possible and a replacement content item of the client is to be rendered in its stead. Similarly, an administrator may issue a command to slow the frame rate of a particular content item on a particular display device in response to receiving log data from the display device that indicates the display device is overheating. In some embodiments, commands are not transmitted to the display device, such that block 720 is not performed by the display device.

Next, in block 730, the display device initiates display of one or more content items according to the received playlist. If updated playlist information was received, such as in block 710, content items selected for rendering on the display device are selected based on the updated playlist. In one embodiment, the display device may adjust the playlist based on application of scheduling rules by the interactive display device 140, hardware considerations associated with the interactive display device 140, and/or any other relevant factors.

Continuing to block 740, the display device 140 detects interactions with video images and/or portions of video images, such as virtual objects that are displayed as part of video images. As noted above, detection of such interactions may be accomplished in various manners such as by analyzing images of a user near a display screen upon which the video images are projected.

Next, in block 750, the display device intermittently transmits incremental interaction data to the management device 750. Depending on the embodiment, the transmission of the interaction data may occur on a periodic schedule, may be transmitted in response to a request for interaction data from the interactive display management device 120 and/or the content client device 170, and/or may be transmitted in response to detection of certain types, quantities, and/or patterns of interactions in the interaction data. For example, a particular interactive display device 140 may be configured to transmit interaction data on a regular basis, unless a particular interaction is detected by the display device. Thus, real-time indications of the particular interaction may be transmitted to the interactive display management device 120, which may adjust not only a playlist for the particular display device 140 but possibly for other display devices 140 in the interactive display network, based at least partly on the detected interaction.

The foregoing description details certain embodiments of the present disclosure. It will be appreciated, however, that no matter how detailed the foregoing appears in text, the present disclosure can be practiced in many ways. As is also stated above, it should be noted that the use of particular terminology when describing certain features or aspects of systems or methods should not be taken to imply that the terminology is being re-defined herein to be restricted to including any specific characteristics of the features or aspects with which that terminology is associated. The scope of this disclosure should therefore be construed in accordance with the appended claims and any equivalents thereof.

What is claimed is:

1. A computerized method of monitoring interactions between users and a plurality of interactive display devices, wherein at least some of the interactive display devices are positioned at disparate locations and are each configured to communicate interaction data via one or more communication networks, the method comprising:
    determining respective playlists for each of the plurality of interactive display devices, wherein each playlist indicates one or more media items for display by the respective interactive display device and an indication of a display time and/or display order for display of at least some of the media items;
    receiving interaction data from at least some of the interactive display devices, wherein the interaction data includes images of interactions between one or more users and virtual objects displayed on respective display devices;
    counting interactions between the one or more users and the virtual objects displayed on the respective display devices;
    determining adjustments to playlists associated with respective interactive display devices based at least partly on the received interaction data and the counted interactions, wherein an adjustment to a first playlist associated with a first interactive display device is based on at least interaction data from a second interactive display device; and
    transmitting updated playlists adjusted according to the determined adjustments or transmitting indications of the determined adjustments to at least respective interactive display devices associated with the updated playlists or determined adjustments.

2. The computerized method of claim 1, further comprising: receiving scheduling rules from respective content clients, wherein the scheduling rules indicate one or more restrictions for display of one or more display items associated with the respective content client.

3. The computerized method of claim 1, further comprising: generating a report indicating interactions associated with at least the content items associated with a particular content client, wherein the report is accessible and/or is transmitted to the particular content client.

4. The computerized method of claim 3, wherein the report for a first content client includes information regarding interactions with content items associated with one or more other content clients.

5. The computerized method of claim 3, wherein the report includes one or more comparisons between first interaction data associated with one or more first content items associated with a first content client and second interaction data associated with one or more second content items associated with a second content client.

6. The computerized method of claim 5, wherein the first interaction data includes interaction data associated with display of the one or more first content items on two or more of the plurality of interactive display devices at different locations.

7. The computerized method of claim 1, wherein each content client has at least non-exclusive control over scheduling of content items associated with the content client.

8. The computerized method of claim 2, wherein the content clients are selected from the group comprising: advertisers, advertising networks, businesses, individuals.

9. The computerized method of claim 1, wherein interaction with a particular virtual object comprises one or more of touching with a portion of a users body a portion of an interactive display device depicting the particular virtual object, touching with an object controlled by the user the portion of the display device depicting the particular virtual object, or placing a portion of the users body in close proximity to the portion of the display device depicting the particular virtual object, or performing a gesture with at least a portion of the users body that is indicative of selection of the particular virtual object.

10. The computerized method of claim 1, wherein said determining adjustments to playlists associated with respective interactive display devices based at least partly on the received interaction data and the counted interactions comprises comparing interaction counts for a first virtual object with interaction counts for other virtual objects.

11. A non-transitory computer readable storage medium having computer-executable instructions stored thereon that, in response to execution by a computing system, cause the computing system to perform operations comprising:
    determining respective schedules of content items for display by respective interactive display devices;
    determining adjustments to one or more schedules associated with respective interactive display devices based at least partly on interaction data associated with respective interactive display devices and a count of interactions between one or more users and portions of video images depicted on respective display devices, wherein the interaction data includes images of interactions between one or more users and portions of video images depicted on respective display devices, wherein a first adjustment associated with a first interactive display device is determined based on at least interaction data from a second interactive display device and the count of interactions; and
    initiating transmission of updated schedules of content items to one or more interactive display devices.

12. The non-transitory computer readable storage medium of claim 11, wherein portions of video images are selected from the group comprising virtual objects, graphical objects, computer generated objects, buttons, icons, menus, and/or toolbars.

13. The non-transitory computer readable storage medium of claim 11, wherein said determining adjustments to the one or more schedules comprises:
   compiling interaction data of a plurality of users with the respective interactive display devices located at different business establishments; and
   determining changes to the one or more schedules associated with the respective interactive display devices based in part on the compiled interaction data.

14. A computerized interactive display management device comprising:
   a display device module configured to:
      receive a plurality of interaction reports from a plurality of interactive display devices, wherein each interaction report includes images of one or more interactions between one or more body parts of users or objects held by users and virtual objects displayed on respective interactive display devices;
      count interactions between the users and the virtual objects displayed on the respective interactive display devices;
      store the received plurality of interaction reports on one or more storage devices; and
      determine, based at least on some of the interaction reports and the counted interactions, changes to a playlist associated with a first display device based on at least interaction data from two of the interactive display devices.

15. The computerized interactive display management device of claim 14, wherein the playlist indicates one or more content items for display by the first display device.

16. The computerized interactive display management device of claim 15, wherein one or more content items include indications of desired display parameters for the respective content item.

17. The computerized interactive display management device of claim 14, further comprising a report module configured to generate reports based on the interaction report for one or more interactive display devices.

* * * * *

UNITED STATES PATENT AND TRADEMARK OFFICE
CERTIFICATE OF CORRECTION

| | | |
|---|---|---|
| PATENT NO. | : 8,595,218 B2 | Page 1 of 1 |
| APPLICATION NO. | : 12/484066 | |
| DATED | : November 26, 2013 | |
| INVENTOR(S) | : Bell et al. | |

It is certified that error appears in the above-identified patent and that said Letters Patent is hereby corrected as shown below:

On Title Page 4, Item (56), under "OTHER PUBLICATIONS", in Column 1, Line 46, delete "10mkp2004/hmtl/r111_text111hock04.html>." and insert -- 10mkp2004/html/r111_text111hock04.html>. --, therefor.

On Title Page 5, Item (56), under "OTHER PUBLICATIONS", in Column 1, Line 41, delete "ternational" and insert -- International --, therefor.

On Title Page 6, Item (56), under "OTHER PUBLICATIONS", in Column 1, Line 17, delete "Electonica" and insert -- Electronica --, therefor.

On Title Page 6, Item (56), under "OTHER PUBLICATIONS", in Column 1, Line 51, delete "Computig" and insert -- Computing --, therefor.

On Title Page 7, Item (56), under "OTHER PUBLICATIONS", in Column 1, Line 3, delete "Technol" and insert -- Technology --, therefor.

In the Specification

In Column 5, Line 3, delete "client 120" and insert -- client 170 --, therefor.

In Column 6, Line 54, delete "clients 210." and insert -- clients 170. --, therefor.

Signed and Sealed this
Thirteenth Day of May, 2014

Michelle K. Lee
*Deputy Director of the United States Patent and Trademark Office*